(12) United States Patent
Liu et al.

(10) Patent No.: US 10,049,302 B1
(45) Date of Patent: Aug. 14, 2018

(54) CLASSIFICATION SYSTEM TRAINING

(71) Applicant: SAS Institute Inc., Cary, NC (US)

(72) Inventors: Jun Liu, Cary, NC (US); Yan Xu, Cary, NC (US); Joshua David Griffin, Harrisburg, NC (US); Manoj Keshavmurthi Chari, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/911,882

(22) Filed: Mar. 5, 2018

Related U.S. Application Data

(60) Provisional application No. 62/533,585, filed on Jul. 17, 2017.

(51) Int. Cl.
  G06K 9/62 (2006.01)
  G06F 17/30 (2006.01)
  G06F 15/18 (2006.01)
  G06N 7/00 (2006.01)
  G06F 17/16 (2006.01)
  G06F 17/18 (2006.01)

(52) U.S. Cl.
  CPC ........... G06K 9/6265 (2013.01); G06F 15/18 (2013.01); G06F 17/16 (2013.01); G06F 17/18 (2013.01); G06F 17/30516 (2013.01); G06K 9/6256 (2013.01); G06N 7/00 (2013.01)

(58) Field of Classification Search
None
See application file for complete search history.

(56) References Cited

U.S. PATENT DOCUMENTS

| 9,536,208 | B1 * | 1/2017 | Kakde | G06N 99/005 |
| 9,639,809 | B1 * | 5/2017 | Kakde | G06N 99/005 |
| 9,652,723 | B2 * | 5/2017 | Anderson | G06N 99/005 |
| 9,830,558 | B1 * | 11/2017 | Chaudhuri | G06N 99/005 |
| 2005/0261837 | A1 * | 11/2005 | Wegerich | G06N 5/025 |
| | | | | 702/19 |

(Continued)

OTHER PUBLICATIONS

SAS Institute Inc. 2017. SAS® Visual Data Mining and Machine Learning 8.1: Programming Guide. Cary, NC: SAS Institute Inc., Mar. 2017.

(Continued)

*Primary Examiner* — Paulinho E Smith
(74) *Attorney, Agent, or Firm* — Bell & Manning, LLC

(57) ABSTRACT

A computing device trains models for streaming classification. A baseline penalty value is computed that is inversely proportional to a square of a maximum explanatory variable value. A set of penalty values is computed based on the baseline penalty value. For each penalty value of the set of penalty values, a classification type model is trained using the respective penalty value and the observation vectors to compute parameters that define a trained model, the classification type model is validated using the respective penalty value and the observation vectors to compute a validation criterion value that quantifies a validation error, and the validation criterion value, the respective penalty value, and the parameters that define a trained model are stored to the computer-readable medium. The classification type model is trained to predict the response variable value of each observation vector based on the respective explanatory variable value of each observation vector.

30 Claims, 12 Drawing Sheets

(56) References Cited

U.S. PATENT DOCUMENTS

| | | | | |
|---|---|---|---|---|
| 2008/0036187 A1* | 2/2008 | Breed | ............... | B60R 21/01516 |
| | | | | 280/735 |
| 2012/0059790 A1* | 3/2012 | Clemencon | .............. | G06N 5/02 |
| | | | | 706/55 |
| 2016/0354543 A1* | 12/2016 | Cinar | .................. | A61M 5/1723 |
| 2017/0236074 A1* | 8/2017 | Peredriy | .............. | G06N 99/005 |
| | | | | 706/12 |

OTHER PUBLICATIONS

SAS Institute Inc. 2017. SAS® Visual Data Mining and Machine Learning 8.1: Data Mining and Machine Learning Procedures. Cary, NC: SAS Institute Inc., Mar. 2017.

Fan et al., LIBLINEAR: A Library for Large Linear Classification, Journal of Machine Learning Research 9, 2008, pp. 1871-1874.

Rosasco et al., Are Loss Functions All the Same?, Neural Computation, 2004.

SA PLUGIN, http://sww.sas.com/saspedia/SA_PLUGIN, Available Nov. 12, 2016.

Support vector machine, http://en.wikipedia.org/wiki/Svm_(machine_learning), Available Oct. 21, 2013.

Abbey et al., Methods of Multinomial Classification Using Support Vector Machines, Apr. 2, 2017.

* cited by examiner

US 10,049,302 B1

CLASSIFICATION SYSTEM TRAINING

CROSS-REFERENCE TO RELATED APPLICATIONS

The present application claims the benefit of 35 U.S.C. § 111(e) to U.S. Provisional Patent Application No. 62/533,585 filed on Jul. 17, 2017, the entire contents of which are hereby incorporated by reference.

BACKGROUND

An increasing number of distributed applications process continuously flowing data from geographically distributed sources, perform analytics on the streamed data, and provide analysis results to entities that may also be geographically distributed. The continuously flowing data may be generated from sensor measurements that capture real-time data describing current operating characteristics of a remote device. The sensor measurements may derive from multiple different types of sensors installed at various locations (e.g., brakes, engine, steering mechanism, cooling system, passenger ventilation, power source, etc.) on a currently-moving vehicle, aircraft or watercraft, for example.

Event stream processing (ESP) can be used to analyze and understand millions of events per second, while detecting patterns of interest as they occur in real time. While processing with sub-millisecond response times for high-volume throughput, data streams can be assessed with ESP to derive insights and take appropriate actions. In streaming analytics, data is received and processed in real-time, which poses many difficulties in designing effective machine learning algorithms.

SUMMARY

In an example embodiment, a non-transitory computer-readable medium is provided having stored thereon computer-readable instructions that, when executed by a computing device, cause the computing device to provide training of classification models. A baseline penalty value is computed using a plurality of observation vectors. Each observation vector of the plurality of observation vectors includes an explanatory variable value and a response variable value. The baseline penalty value is inversely proportional to a square of a maximum explanatory variable value. A set of penalty values is computed based on the computed baseline penalty value. For each penalty value of the set of penalty values, a classification type model is trained using the respective penalty value and the plurality of observation vectors to compute parameters that define a trained model, the trained classification type model is validated using the respective penalty value and the plurality of observation vectors to compute a validation criterion value for the trained classification type model that quantifies a validation error, and the computed validation criterion value, the respective penalty value, and the computed parameters that define a trained model are stored to the computer-readable medium. The classification type model is trained to predict the response variable value of each observation vector based on the respective explanatory variable value of each observation vector. A best classification model is determined based on the stored, computed validation criterion value of each trained classification type model. The respective penalty value and the computed parameters associated with the determined best classification model are output for predicting a new response variable value from a new observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide training of classification models.

In yet another example embodiment, a method of providing training of classification models is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
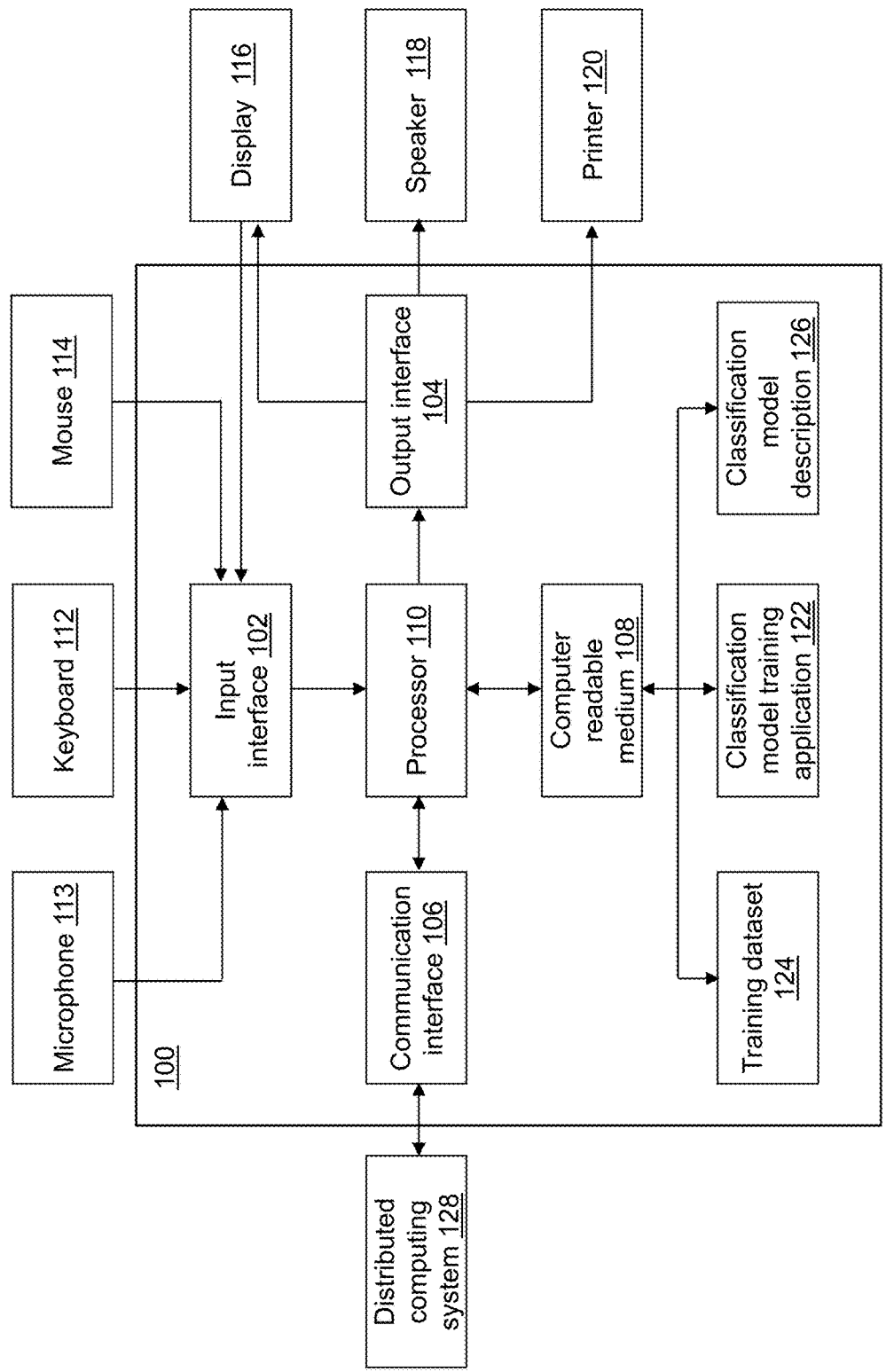
FIG. 1 depicts a block diagram of a classification model training device in accordance with an illustrative embodiment.

Referring to FIG. 1, a block diagram of a classification model training device 100 is shown in accordance with an illustrative embodiment. Classification model training device 100 provides classification model training that may performed in a single machine batch mode, in a distributed batch mode on a cluster of machines that distribute a training dataset 124 and/or the computations on one or more computing devices, or in a streaming mode in which training data is received in an event stream by classification model training device 100 that is executing an event stream processing engine (ESPE). Classification model training device 100 may include an input interface 102, an output interface 104, a communication interface 106, a non-transitory computer-readable medium 108, a processor 110, a classification model training application 122, training dataset 124, and a classification model description 126. Fewer, different, and/or additional components may be incorporated into classification model training device 100.

Input interface 102 provides an interface for receiving information from the user or another device for entry into classification model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification model training device 100 or to make trainings presented in a user interface displayed on display 116.

The same interface may support both input interface 102 and output interface 104. For example, display 116 comprising a touch screen provides a mechanism for user input and for presentation of output to the user. Classification model training device 100 may have one or more input interfaces that use the same or a different input interface technology. The input interface technology further may be accessible by classification model training device 100 through communication interface 106.

Output interface 104 provides an interface for outputting information for review by a user of classification model training device 100 and/or for use by another application or device. For example, output interface 104 may interface with various output technologies including, but not limited to, display 116, a speaker 118, a printer 120, etc. Classification model training device 100 may have one or more output interfaces that use the same or a different output interface technology. The output interface technology further may be accessible by classification model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification model training device 100 may have one or more communication interfaces that use the same or a different communication interface technology. For example, classification model training device 100 may support communication using an Ethernet port, a Bluetooth antenna, a telephone jack, a USB port, etc. Data and/or messages may be transferred between classification model training device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification model training device 100 also may have one or more drives that support the loading of a memory media such as a CD, DVD, an external hard drive, etc. One or more external hard drives further may be connected to classification model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification model training application 122 performs operations associated with defining classification model description 126 from data stored in training dataset 124. Classification model description 126 may be used to predict a response variable value for data stored in an input dataset 324 (shown referring to FIG. 3). Some or all of the operations described herein may be embodied in classification model training application 122. The operations may be implemented using hardware, firmware, software, or any combination of these methods.

Referring to the example embodiment of FIG. 1, classification model training application 122 is implemented in software (comprised of computer-readable and/or computer-executable instructions) stored in computer-readable medium 108 and accessible by processor 110 for execution of the instructions that embody the operations of classification model training application 122. Classification model training application 122 may be written using one or more programming languages, assembly languages, scripting languages, etc. Classification model training application 122 may be integrated with other analytic tools. As an example, classification model training application 122 may be part of an integrated data analytics software application and/or software architecture such as that offered by SAS Institute Inc. of Cary, N.C., USA. Merely for illustration, classification model training application 122 may be implemented using or integrated with one or more SAS software tools such as JMP®, Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Data mining, statistical analytics, and response classification prediction are applicable in a wide variety of industries to solve technical problems.

Classification model training application 122 may be implemented as a Web application. For example, classification model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables may include a response variable Y and one or more explanatory variables that define an explanatory vector X for each observation vector. Training dataset 124 may include additional variables that are not the response variable Y or one of the explanatory variables. An observation vector is defined as ($y_i$, $x_i$) that may include a value for each of the response variable Y and the explanatory variables associated with the observation vector i. One or more variables of the plurality of variables may describe a characteristic of a physical object. For example, if training dataset 124 includes data related to operation of a vehicle, the variables may include a type of vehicle, an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing or streamed to classification model training device 100 as it is generated.

Training dataset 124 may be stored on computer-readable medium 108 or on one or more computer-readable media of distributed computing system 128 and accessed by classification model training device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on classification model training device 100 or on distributed computing system 128. Classification model training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™ Some systems may use SAS In-Memory Statistics for Hadoop® to read big data once and analyze it several times by persisting it in-memory for the entire session. Some systems may be of other types and configurations.

A classification model models a classification of Y given an explanatory variable X. For illustration, a classification model can be defined using the HPSVM procedure implemented by SAS® Enterprise Miner™ software, the SVMACHINE procedure implemented by SAS® Visual Data Mining and Machine Learning, software, the HPLOGISTIC procedure implemented by SAS/STAT® software, and the GENSELECT procedure implemented by SAS® Visual Statistics software. For illustration, a paper tiled LIBLINEAR: A Library for Large Linear ClassicationThe HPSVM and the SVMACHINE procedures implement a support vector machine (SVM) algorithm that computes support vector machine learning classifiers for a binary pattern recognition problem that has been broadly used in fields such as image classification, handwriting recognition, financial decision, text mining, etc. The HPLOGISTIC procedure estimates the parameters of a logistic regression model using maximum likelihood techniques.

Figure 2:
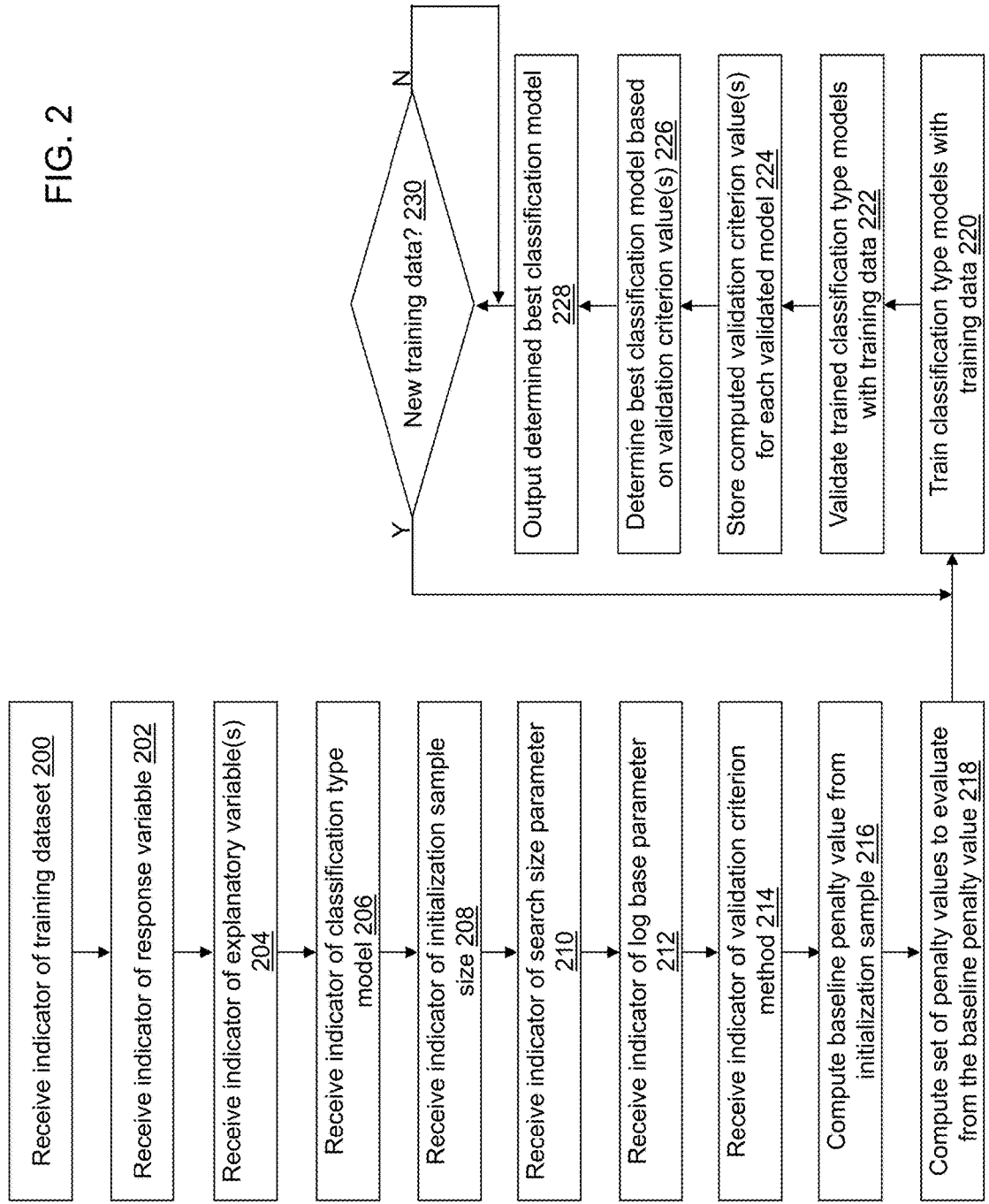
FIG. 2 depicts a flow diagram illustrating examples of operations performed by a classification model training application of the classification model training device of FIG. 1 in accordance with an illustrative embodiment.

Referring to FIG. 2, example operations associated with classification model training application 122 are described. Additional, fewer, or different operations may be performed depending on the embodiment of classification model training application 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute classification model training application 122, which causes presentation of a first user interface window, which may include a plurality of menus and selectors such as drop-down menus, buttons, text boxes, hyperlinks, etc. associated with classification model training application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by classification model training application 122.

Referring to FIG. 2, in an operation 200, a first indicator may be received that indicates training dataset 124. For example, the first indicator indicates a location and a name of training dataset 124. As an example, the first indicator may be received by classification model training application 122 after training from a user interface window or after entry by a user into a user interface window. In an alternative embodiment, training dataset 124 may not be selectable. For example, a most recently created dataset may be used automatically.

In an operation 202, a second indicator may be received that indicates response variable Y in training dataset 124. For example, the second indicator may indicate a column number or a column name. As another option, a first or a last column of training dataset 124 may be assumed to be the response variable Y column.

In an operation 204, a third indicator may be received that indicates one or more explanatory variables X in training dataset 124. For example, the third indicator may indicate one or more column numbers or one or more column names. As another option, a first or a last column of training dataset 124 may be assumed to be the explanatory variable X column. As understood by a person of skill in the art, when the third indicator indicates a plurality of explanatory variables, X defines an explanatory variable vector.

In an operation 206, a fourth indicator may be received that indicates a classification type model. For example, the fourth indicator indicates a name of a classification type model. The fourth indicator may be received by classification model training application 122 after training from a user interface window or after entry by a user into a user interface window. A default value for the classification type model may further be stored, for example, in computer-readable medium 108. As an example, a classification type model may be selected from "SVM" and "LOG REG". The classification type model indicated by "SVM" may refer to a support vector machine (SVM) model. The classification type model indicated by "LOG REG" may refer to a logistic regression model. For example, a default classification type model may be indicated by "SVM". Of course, the classification type model may be labeled or selected in a variety of different manners by the user as understood by a person of skill in the art. In an alternative embodiment, the classification type model may not be selectable, and a single classification type model is implemented by classification model training application 122. For example, the classification type model indicated as "SVM" may be used by default or without allowing a selection.

In an operation 208, a fifth indicator of a value of an initialization sample size $N_T$ may be received. In an alternative embodiment, the fifth indicator may not be received. For example, a default value may be stored, for example, in computer-readable medium 108 and used automatically. In another alternative embodiment, the value of the initialization sample size $N_T$ may not be selectable. Instead, a fixed, predefined value may be used. For illustration, a default value of the initialization sample size $N_T$ may be 10 to 1000.

In an operation 210, a sixth indicator of a value of a search size parameter t may be received. In an alternative embodiment, the sixth indicator may not be received. For example, a default value may be stored, for example, in computer-readable medium 108 and used automatically. In another alternative embodiment, the value of the search size parameter t may not be selectable. Instead, a fixed, predefined value may be used. For illustration, a default value of the search size parameter t may be four.

In an operation 212, a seventh indicator of a value of a log base parameter p may be received. In an alternative embodiment, the seventh indicator may not be received. For example, a default value may be stored, for example, in computer-readable medium 108 and used automatically. In another alternative embodiment, the value of the log base parameter ρ may not be selectable. Instead, a fixed, predefined value may be used. For illustration, a default value of the log base parameter ρ may be ten.

In an operation 214, an eighth indicator may be received that indicates a validation criterion method used to estimate a quality of or a goodness of fit of each classification model to paired values of the explanatory variable X and the response variable Y read from training dataset 124. For example, the eighth indicator indicates a name of a validation criterion method. The eighth indicator may be received by classification model training application 122 after training from a user interface window or after entry by a user into a user interface window. A default value for the validation criterion method may further be stored, for example, in computer-readable medium 108. As an example, a validation criterion method may be selected from "Loss", "Misclassification", "F-score", etc. The validation criterion method indicated by "Loss" may refer to a logistic loss function when the classification type is a logistic regression model or to a hinge loss function when the classification type is an SVM model. The validation criterion method indicated by "Misclassification" may refer to an accumulated misclassification error value that is a proportion of data points misclassified over training dataset 124. The misclassification value can be defined as $$M = \frac{fp+fn}{tp+tn+fp+fn},$$

where tp is a number of true positives, tn is a number of true negatives, fp is a number of false positives, and fn is a number of false negatives. The validation criterion method indicated by "F-score" may refer to an F-score function. F-score can be defined as $$F_{score} = 2 * \frac{\text{precision} * \text{recall}}{\text{precision} + \text{recall}},$$

where $$\text{precision} = \frac{tp}{tp+fp} \text{ and recall} = \frac{tp}{tp+fn}.$$

For example, for a text search on a set of documents, precision is a number of correct results divided by a number of all returned results. recall is a number of correct results divided by a number of results that should have been returned. F-score is a harmonic mean of precision and recall.

For example, a default validation criterion method may be indicated by "F-score". Of course, the validation criterion method may be labeled or selected in a variety of different manners by the user as understood by a person of skill in the art. In an alternative embodiment, the validation criterion method may not be selectable, and a single validation criterion method is implemented by classification model training application 122. For example, the validation criterion method indicated as "F-score" may be used by default or without allowing a training.

In an operation 216, a baseline penalty value is computed using $$C_B = \frac{1}{\max_i \|x_i\|^2},$$

where i=1, 2, ..., $N_T$, $N_T$ is the initialization sample size, and $x_i$ is the explanatory variable value for observation vector i.

In an operation 218, a set of penalty values to evaluate is computed from the baseline penalty value $C_B$ using $C_B*[\rho^{-t}, \rho^{-t+1}, \ldots, \rho^0, \ldots \rho^{t-1}, \rho^t]$, where t is the search size parameter, and p is the log base parameter. The set of penalty values includes 2t+1 number of penalty values to evaluate defined as $\{C_B*\rho^{-t}, C_B*\rho^{-t+1}, \ldots, C_B, \ldots, C_B*\rho^{t-1}, C_B*\rho^t\}$.

In an operation 220, a classification model is trained for each penalty value included in the set of penalty values using each observation vector read from training dataset 124 based on the classification type model selected in operation 206.

For example, the objective function for the SVM classification type model is $$\min_w \frac{1}{2}\|w\|_2^2 + C\sum_{i=1}^n \max(0, 1 - y_i w^T x_i).$$

The dual problem of the objective function for the SVM classification type model can be written as:

$$\min_\alpha \frac{1}{2}\alpha^T Y X X^T Y^T \alpha - e^T \alpha,$$

$$\alpha: 0 \leq \alpha_i \leq C, \forall i = 1, \ldots, n$$

where the i-th row of X corresponds to $x_i$, $Y=_1$, diag($y_1, y_2, \ldots, y_n$), where n is a number of observation vectors in training dataset 124, $\alpha_i$ are Lagrange constants, and C is the penalty value. Optionally, the i-th row of the data may be forgotten by setting $y_1=0$.

For example, the objective function for the logistic regression classification type model is $$\min_w \frac{1}{2}\|w\|_2^2 + C\sum_{i=1}^n \log(1 + e^{(-y_i w^T x_i)}).$$

The dual problem of the objective function for the logistic regression classification type model can be written as:

$$\min_{\alpha} \frac{1}{2} \alpha^T Y X X^T Y^T \alpha + \sum_{i=1}^{n} (\alpha_i \log \alpha_i + (C - \alpha_i) \log(C - \alpha_i)),$$

$$\alpha: 0 \le \alpha_i \le C, \forall i = 1, \ldots, n.$$

For illustration, a dual coordinate descent optimization algorithm may be used to solve the dual problem of the SVM classification type model and of the logistic regression classification type model to compute the Lagrange constants $\alpha_i$ that describe the trained model with C defined as each penalty value of the set of penalty values to define 2t+1 trained models in operation 220. The 2t+1 trained models may be trained sequentially or in parallel, for example, using multiple threads and/or computing devices of distributed computing system 128.

There is usually a bias term included in SVM and logistic regression classification models. However, if the bias term is included in the optimization problem, the dual problem has an additional constraint that does not favor optimization using the dual coordinate descent method. One way to deal with the bias term is to add a column of 1's to the matrix X. However, this does not consider the scale of values in X, which may lead to an augmented value that is either too small or too large. As an alternative, a maximum absolute value computed using $\max_i \|x_i\|$ where i=1, 2, . . . , $N_T$ is added as a column to the matrix X to deal with the bias term when solving the dual optimization problem.

In an operation 222, each trained classification model is validated using each observation vector read from training dataset 124 and a validation criterion value or values is computed based on the validation criterion method selected in operation 214.

In an operation 224, the coefficients that describe each validated classification model and the computed validation criterion value may be stored in computer-readable medium 108 in association with the penalty value C of the set of penalty values used to train the validated classification model. For illustration, the coefficients are the Lagrange constants $\alpha_i$ that describe the trained model.

Zero or more additional parameters (referred to as hyperparameters where the penalty value C is also a hyperparameter) may be defined for each classification type model. For example, the SVM classification type model may further be trained using a degree parameter value that is a degree of a polynomial kernel. The SVM classification type model further may be trained using one or more values of the degree parameter value. For illustration, SAS® Visual Data Mining and Machine Learning software includes an auto-tune action set that includes a tuneSvm action. The tuneSvm action selects different hyperparameter configurations of the degree parameter value and the set of penalty values to run the svmTrain action of the svm action set, the score action of the astore action set, and the assess action of the percentile action set to train and validate support vector machine models as it searches for a model that has reduced validation error.

In an operation 226, a classification model having the best validation criterion value is determined from the stored validation criterion value(s). For example, a minimum validation criterion value may be identified from the stored validation criterion values, and the penalty value C and the coefficients may be selected to define the determined best classification model. In alternative embodiments, a maximum validation criterion value may be used to determine the best classification model.

In an operation 228, the coefficients for the determined best classification model, the penalty value associated with the determined best classification model, and any other hyperparameter values associated with the determined best classification model are written to and stored in classification model description 126.

In an operation 230, a determination is made concerning whether new training data is received. When new training data is received, processing continues in operation 220 to determine a new best classification model. When new training data is not received, processing continues in operation 230 to wait for new training data, or processing is stopped.

There are existing strategies for setting values for the penalty value C to be evaluated such as a logarithmic scale search, a latin grid search, etc. For example, assuming that a best penalty value C is C=0.0001. If a logarithmic search for the penalty value C in the interval [0.01,100] is used, the selected best penalty value C in that range is still far removed from C=0.0001. However, if we know that a good baseline value is $$C_B = \frac{1}{\max_i \|x_i\|^2} = 0.001$$

the selected best penalty value C=0.0001 can be found in the adjusted interval 0.001*[0.01,100]. $C_B$ is dependent on the data and is invariant to the scaling of the data.

The best value for the penalty value C is data dependent and the setting of the proper C can be very challenging especially when data is streamed. Also, the model quality can decay quickly because the data pattern may change over time. Classification model training application 122 provides a method to improve initialization of the penalty value C and to adjust the penalty value C effectively and timely.

Figure 3:
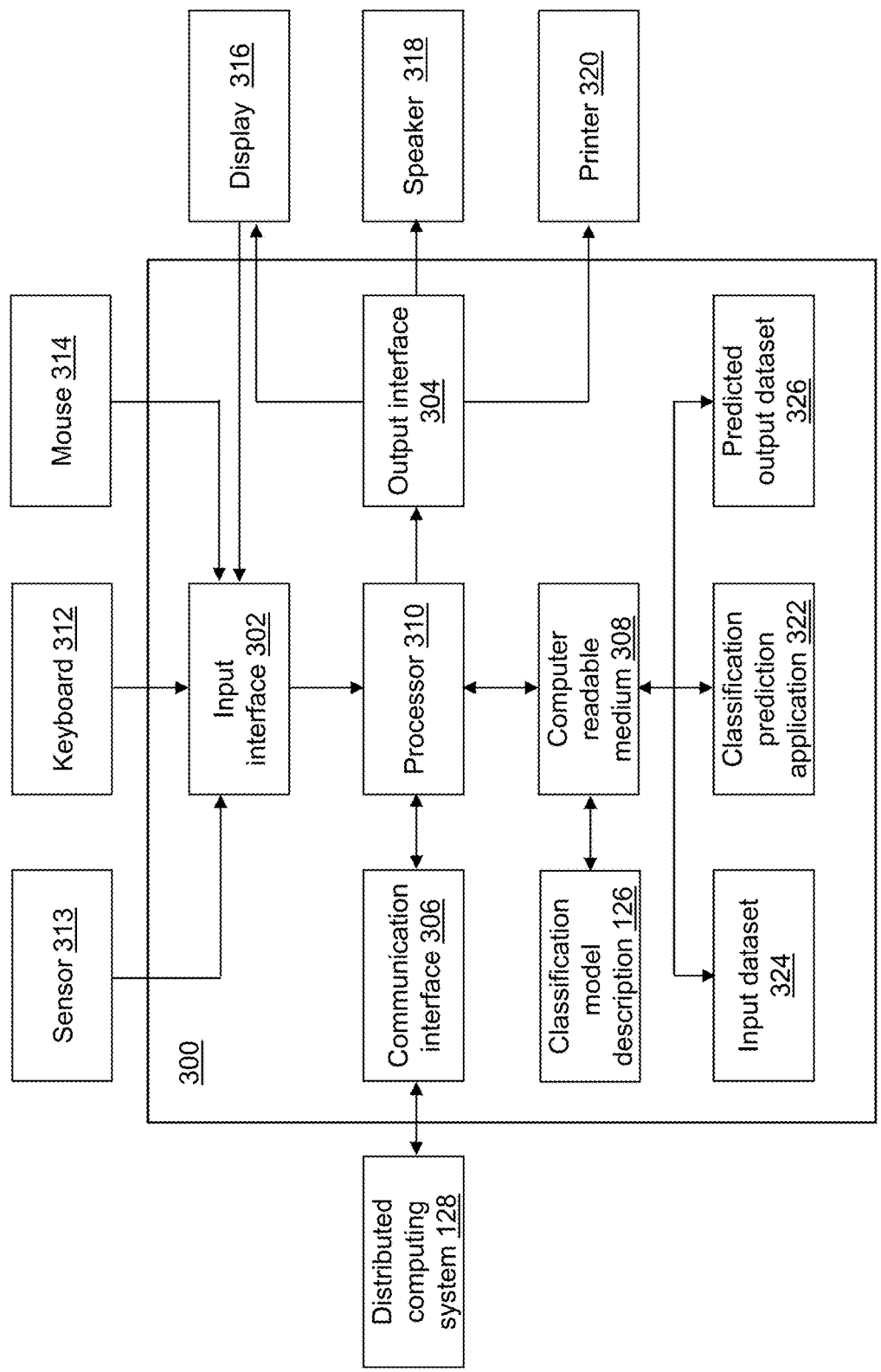
FIG. 3 depicts a block diagram of a classification prediction device that uses the selected classification model to predict a result in accordance with an illustrative embodiment.

Referring to FIG. 3, a block diagram of a classification prediction device 300 is shown in accordance with an illustrative embodiment. Classification prediction device 300 may include a second input interface 302, a second output interface 304, a second communication interface 306, a second non-transitory computer-readable medium 308, a second processor 310, a classification prediction application 322, classification model description 126, an input dataset 324, and predicted output dataset 326. Fewer, different, and/or additional components may be incorporated into classification prediction device 300. Classification prediction device 300 and classification model training device 100 may be the same or different devices.

Second input interface 302 provides the same or similar functionality as that described with reference to input interface 102 of classification model training device 100 though referring to classification prediction device 300. Second output interface 304 provides the same or similar functionality as that described with reference to output interface 104 of classification model training device 100 though referring to classification prediction device 300. Second communication interface 306 provides the same or similar functionality as that described with reference to communication interface 106 of classification model training device 100 though referring to classification prediction device 300. Data and messages may be transferred between classification prediction device 300 and distributed computing system 128 using second communication interface 306. Second computer-readable medium 308 provides the same or similar functionality as that described with reference to computer-readable medium 108 of classification model training device 100 though referring to classification prediction device 300. Second processor 310 provides the same or similar functionality as that described with reference to processor 110 of classification model training device 100 though referring to classification prediction device 300.

Classification prediction application 322 performs operations associated with predicting values for response variable Y using classification model description 126 based on values for the explanatory variable X (or explanatory variable vector X) stored in input dataset 324. Dependent on the type of data stored in training dataset 124 and input dataset 324, classification prediction application 322 may identify anomalies as part of process control, for example, of a manufacturing process, classify images, for example, those produced by an electro-cardiogram device, etc. Some or all of the operations described herein may be embodied in classification prediction application 322. The operations may be implemented using hardware, firmware, software, or any combination of these methods.

Referring to the example embodiment of FIG. 3, classification prediction application 322 is implemented in software (comprised of computer-readable and/or computer-executable instructions) stored in second computer-readable medium 308 and accessible by second processor 310 for execution of the instructions that embody the operations of classification prediction application 322. Classification prediction application 322 may be written using one or more programming languages, assembly languages, scripting languages, etc. Classification prediction application 322 may be integrated with other analytic tools. For example, classification prediction application 322 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of classification prediction application 322 further may be performed by an ESPE. Classification prediction application 322 and classification model training application 122 further may be integrated applications.

Classification prediction application 322 may be implemented as a Web application. Classification prediction application 322 may be integrated with other system processing tools to automatically process data generated as part of operation of an enterprise using second input interface 302, second output interface 304, and/or second communication interface 306 so that appropriate action can be initiated in response. For example, a warning or an alert may be presented using a second display 316, a second speaker 318, a second printer 620, etc. or sent to one or more computer-readable media, display, speaker, printer, etc. of distributed computing system 128 based on predicted classification values for response variable Y.

Training dataset 124 and input dataset 324 may be generated, stored, and accessed using the same or different mechanisms. Similar to training dataset 124, input dataset 324 may include a plurality of rows and a plurality of columns with the plurality of rows referred to as observation vectors or records, and the columns referred to as variables that are associated with an observation. Input dataset 324 may be transposed.

Similar to training dataset 124, input dataset 324 may be stored on second computer-readable medium 308 or on one or more computer-readable media of distributed computing system 128 and accessed by classification prediction device 300 using second communication interface 306. Data stored in input dataset 324 may be a sensor measurement or a data communication value, for example, from a sensor 313, may be generated or captured in response to occurrence of an event or a transaction, generated by a device such as in response to an interaction by a user with the device, for example, from a second keyboard 312 or a second mouse 314, etc. The data stored in input dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 324 may be captured at different time points periodically, intermittently, when an event occurs, etc. One or more columns may include a time value. Similar to training dataset 124, data stored in input dataset 324 may be generated as part of the IoT, and some or all data may be pre- or post-processed by an ESPE.

Similar to training dataset 124, input dataset 324 may be stored in various compressed formats such as a coordinate format, a compressed sparse column format, a compressed sparse row format, etc. Input dataset 324 further may be stored using various structures as known to those skilled in the art including a file system, a relational database, a system of tables, a structured query language database, etc. on classification model training device 100, on classification prediction device 300, and/or on distributed computing system 128. Classification prediction device 300 and/or distributed computing system 128 may coordinate access to input dataset 324 that is distributed across a plurality of computing devices. For example, input dataset 324 may be stored in a cube distributed across a grid of computers as understood by a person of skill in the art. As another example, input dataset 324 may be stored in a multi-node Hadoop® cluster. As another example, input dataset 324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 324.

Figure 4:
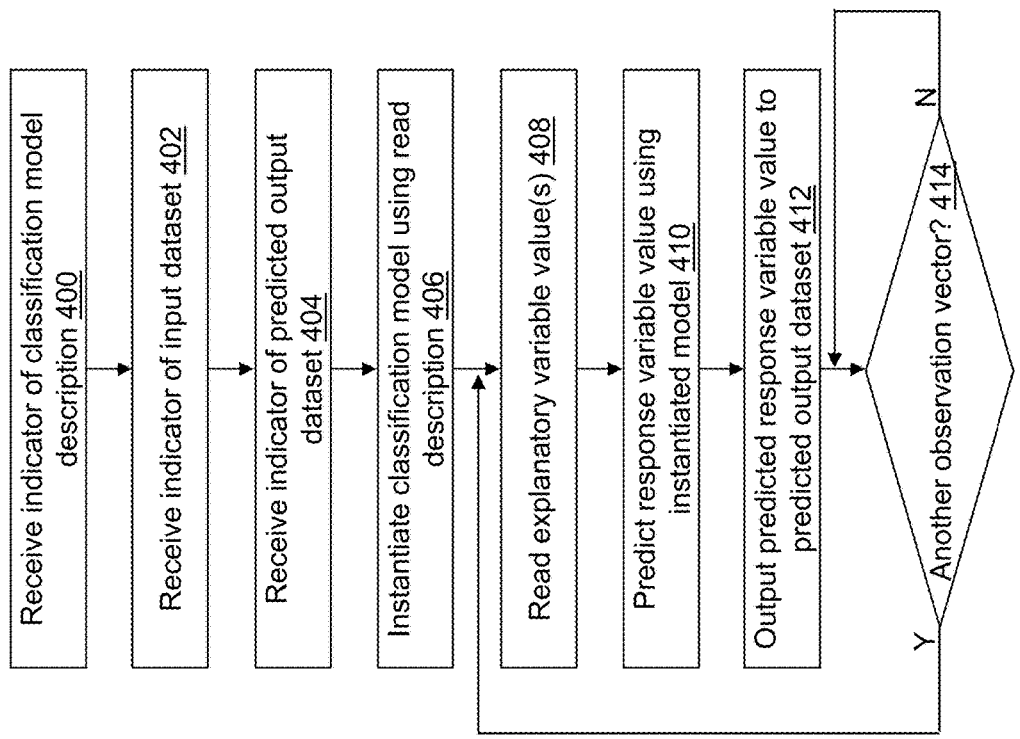
FIG. 4 depicts a flow diagram illustrating examples of operations performed by the classification prediction device of FIG. 3 in accordance with an illustrative embodiment.

Referring to FIG. 4, example operations of classification prediction application 322 are described. Additional, fewer, or different operations may be performed depending on the embodiment of classification prediction application 322. The order of presentation of the operations of FIG. 4 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, a ninth indicator may be received that indicates classification model description 126. For example, the ninth indicator indicates a location and a name of classification model description 126. As an example, the ninth indicator may be received by classification prediction application 322 after training from a user interface window or after entry by a user into a user interface window. In an alternative embodiment, classification model description 126 may not be selectable. For example, a most recently created classification model description may be used automatically.

In an operation 402, a tenth indicator may be received that indicates input dataset 324. For example, the tenth indicator indicates a location and a name of input dataset 324. As an example, the tenth indicator may be received by classification prediction application 322 after training from a user interface window or after entry by a user into a user interface window. In an alternative embodiment, input dataset 324 may not be selectable. For example, a most recently created dataset may be used automatically.

In an operation 404, an eleventh indicator may be received that indicates predicted output dataset 326. For example, the eleventh indicator indicates a location and a name of predicted output dataset 326. As an example, the eleventh indicator may be received by classification prediction application 322 after training from a user interface window or after entry by a user into a user interface window. In an alternative embodiment, predicted output dataset 326 may not be selectable. For example, a default name and location for predicted output dataset 326 may be used automatically.

In an operation 406, a classification model is instantiated based on the classification model description read from classification model description 126. For example, the Lagrange constants, the penalty value, and any other hyperparameter value(s) associated with the read classification model description are used to instantiate the classification model.

In an operation 408, a value(s) x for the explanatory variable X is read from a next line of input dataset 324 or optionally is received from an ESPE.

In an operation 410, a classification value y for the response variable Y is predicted using the instantiated classification model and the read value(s) x.

In an operation 412, the predicted classification value y for the response variable Y is output to predicted output dataset 326. The value x and/or other values read from input dataset 324 further may be output to predicted output dataset 326.

In an operation 414, a determination is made concerning whether there is another observation vector to process. When there is another observation vector to process, processing continues in operation 408. When there is not another observation vector to process, processing continues in operation 414 to wait for receipt of another observation vector, for example, from an ESPE, or processing is done.

Figure 5:
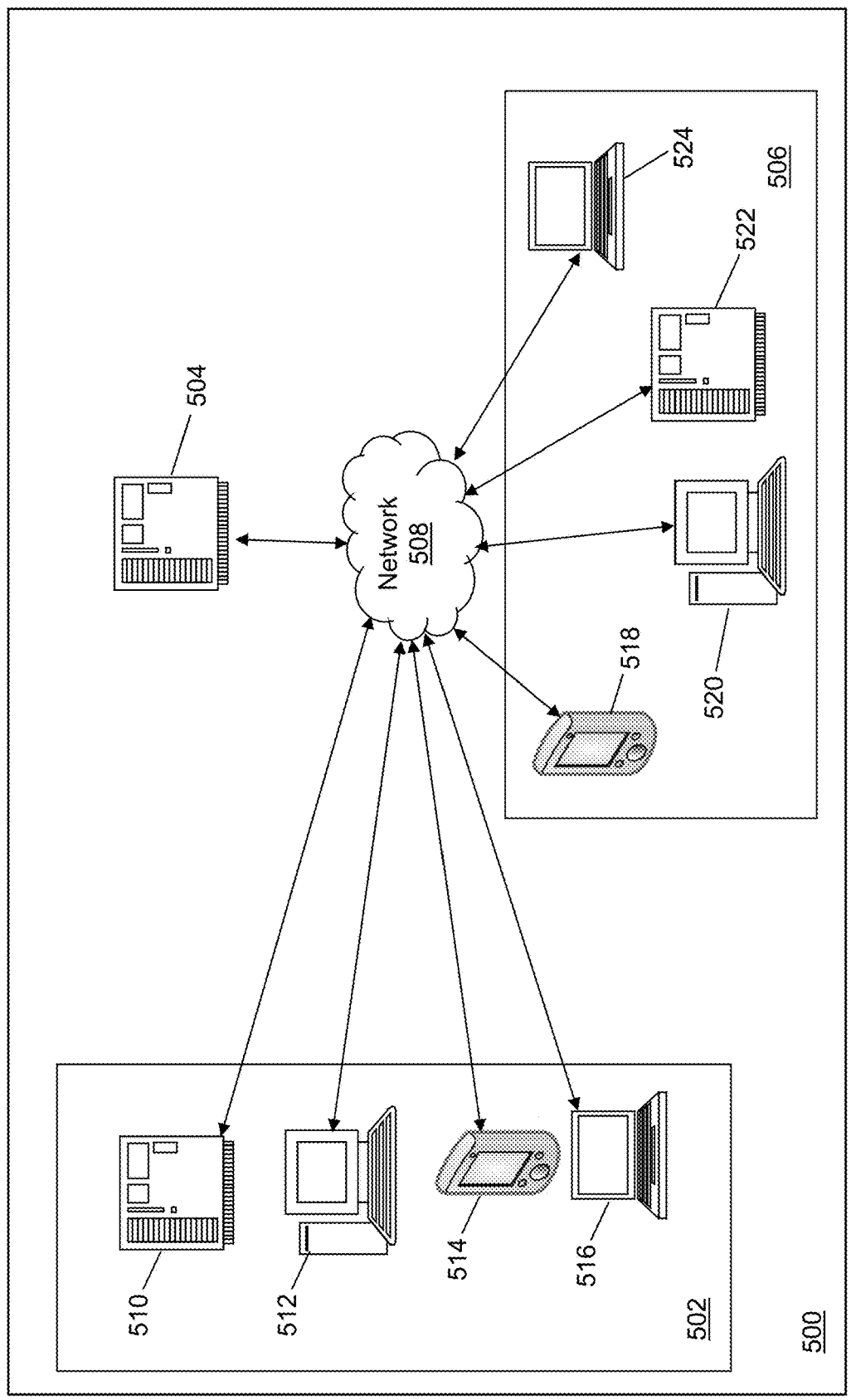
FIG. 5 depicts a block diagram of a stream processing system in accordance with an illustrative embodiment.

Referring to FIG. 5, a block diagram of a stream processing system 500 is shown in accordance with an illustrative embodiment. In an illustrative embodiment, stream processing system 500 may include an event publishing system 502, a ESP device 504, an event subscribing system 506, and a network 508. Each of event publishing system 502, ESP device 504, and event subscribing system 506 may be composed of one or more discrete devices in communication through network 508.

Event publishing system 502 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a surveillance system, a medical imaging device, a power grid system, a telecommunications system, a fluid (e.g., oil, gas, water, etc.) pipeline, a transportation system, an industrial device, a medical device, an appliance, a vehicle, a computing device, etc. Example sensors include a camera or other image creation device, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

For example, a truck may be equipped with hundreds of sensors though as autonomous vehicle technology advances, the number of sensors is increasing rapidly. These sensors stream all types of events that are valuable to both a truck driver and a truck manufacturer. Some events require immediate reactions via Edge Analytics while others need to be processed in the Cloud where more comprehensive and detailed analysis is performed. However, the deployment of analytic tools and models in the Cloud that meets the requirements of large scale, geographically distributed, and highly dynamic sensors is challenging.

Event publishing system 502 publishes the measurement data value to ESP device 504 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 504 receives the measurement data value in an event stream, processes the measurement data value, and identifies a computing device of event subscribing system 506 to which the processed measurement data value is sent.

Network 508 may include one or more networks of the same or different types. Network 508 can be any type of wired and/or wireless public or private network including a cellular network, a local area network, a wide area network such as the Internet or the World Wide Web, etc. Network 508 further may comprise sub-networks and consist of any number of communication devices.

The one or more computing devices of event publishing system 502 may include computing devices of any form factor such as a server computer 510, a desktop 512, a smart phone 514, a laptop 516, a personal digital assistant, an integrated messaging device, a tablet computer, a point of sale system, a transaction system, etc. Event publishing system 502 can include any number and any combination of form factors of computing devices that may be organized into subnets. The computing devices of event publishing system 502 send and receive signals through network 508 to/from another of the one or more computing devices of event publishing system 502 and/or to/from ESP device 504. The one or more computing devices of event publishing system 502 may communicate using various transmission media that may be wired and/or wireless as understood by those skilled in the art. The one or more computing devices of event publishing system 502 may be geographically dispersed from each other and/or co-located. Each computing device of the one or more computing devices of event publishing system 502 may be executing one or more event publishing application.

Figure 6:
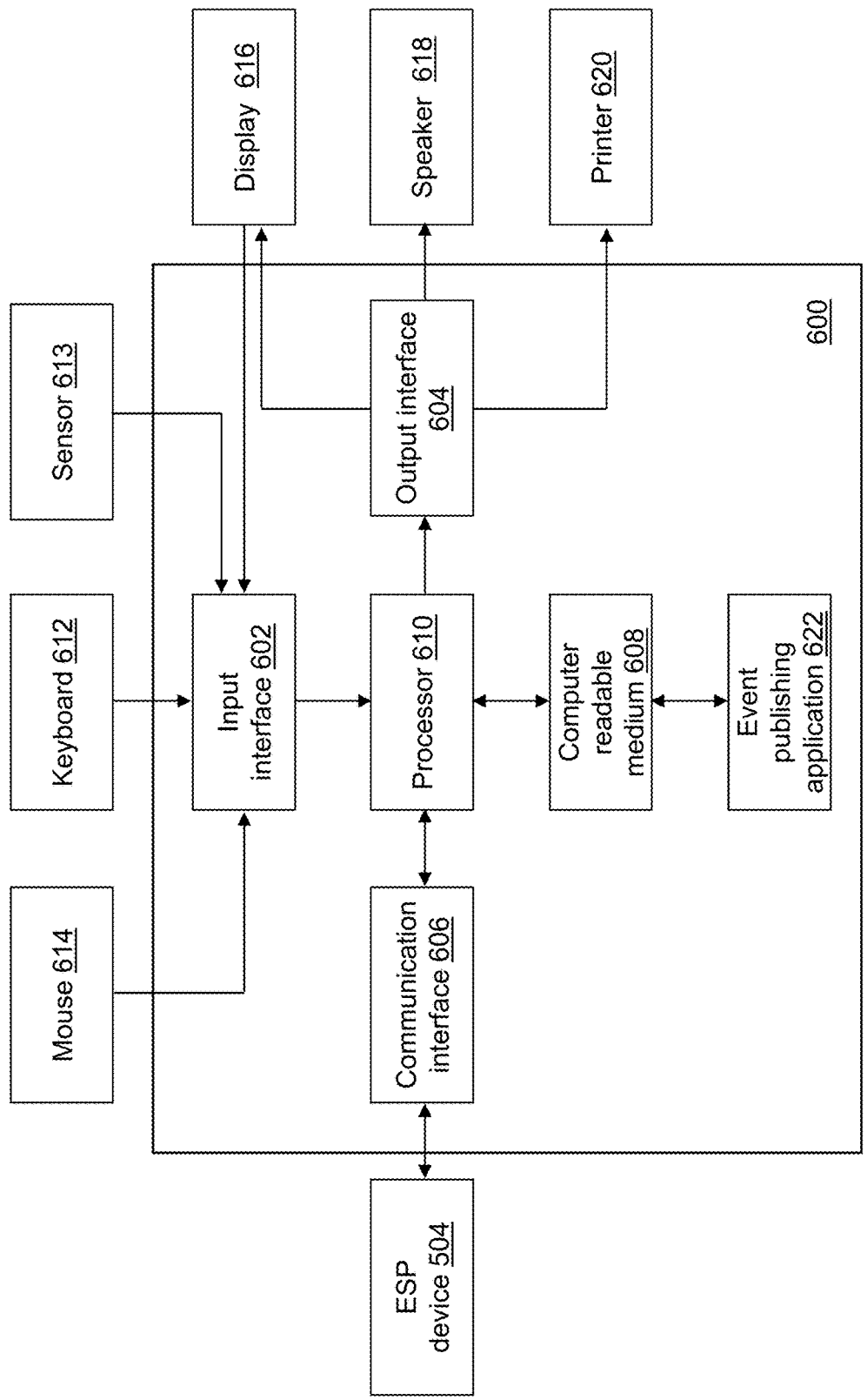
FIG. 6 depicts a block diagram of an event publishing device of an event publishing system of the stream processing system of FIG. 5 in accordance with an illustrative embodiment.

For illustration, referring to FIG. 6, a block diagram of an event publishing device 600 is shown in accordance with an example embodiment. Event publishing device 600 is an example computing device of event publishing system 502. For example, each of server computer 510, a desktop 512, a smart phone 514, a laptop 516 may be an instance of event publishing device 600. Event publishing device 600 may include a third input interface 202, a third output interface 204, a third communication interface 206, a third non-transitory computer-readable medium 208, a third processor 210, and an event publishing application 622. Each computing device of event publishing system 502 may be executing event publishing application 622 of the same or different type.

Referring again to FIG. 5, the one or more computing devices of event subscribing system 506 may include computers of any form factor such as a smart phone 518, a desktop 520, a server computer 522, a laptop 524, a personal digital assistant, an integrated messaging device, a tablet computer, etc. Event subscribing system 506 can include any number and any combination of form factors of computing devices. The computing devices of event subscribing system 506 send and receive signals through network 508 to/from ESP device 504. The one or more computing devices of event subscribing system 506 may be geographically dispersed from each other and/or co-located. The one or more computing devices of event subscribing system 506 may communicate using various transmission media that may be wired and/or wireless as understood by those skilled in the art. Each computing device of the one or more computing devices of event subscribing system 506 may be executing one or more event subscribing application.

Figure 9:
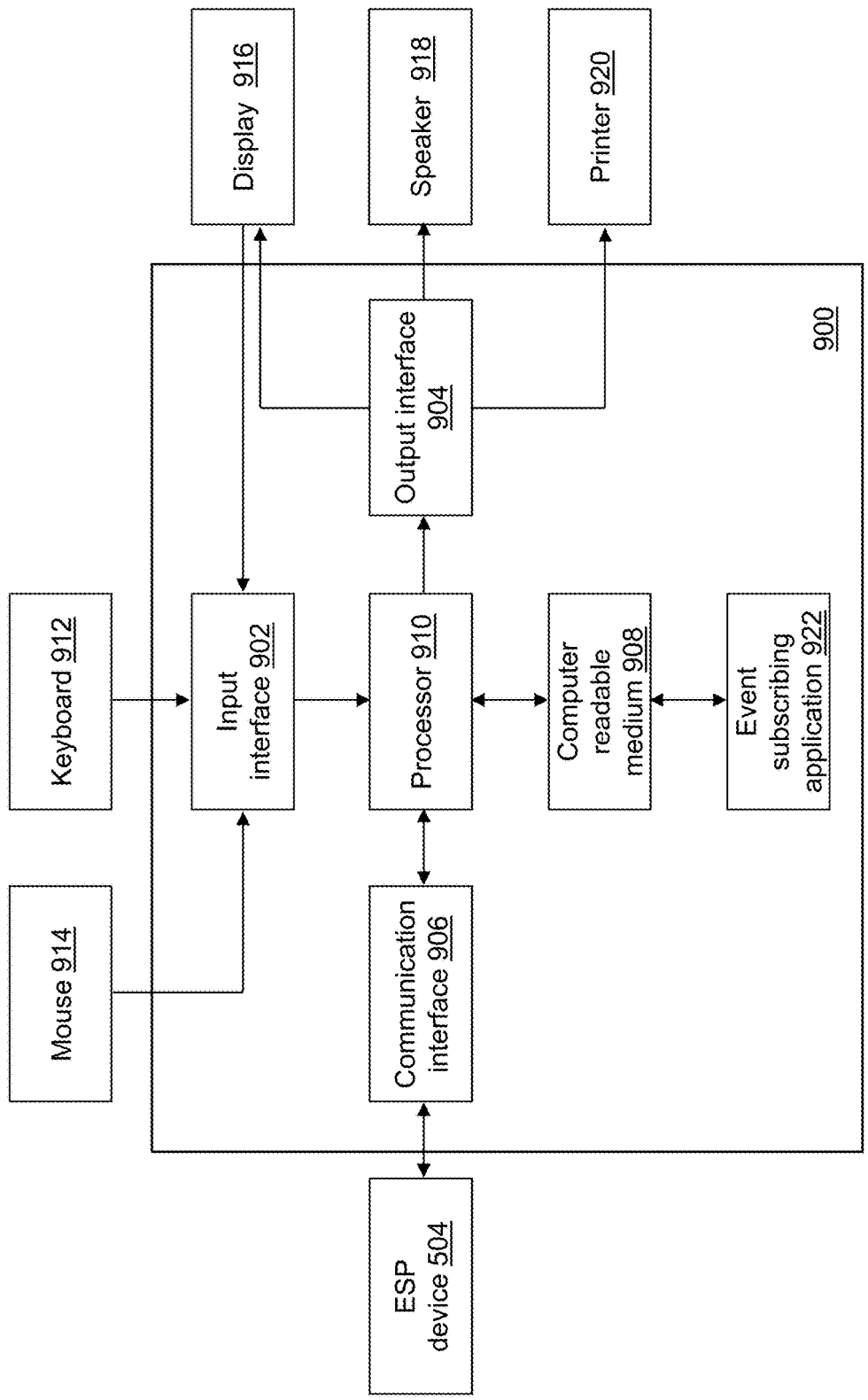
FIG. 9 depicts a block diagram of an event subscribing device of an event subscribing system of the stream processing system of FIG. 5 in accordance with an illustrative embodiment.

For illustration, referring to FIG. 9, a block diagram of an event subscribing device 900 is shown in accordance with an example embodiment. Event subscribing device 900 is an example computing device of event subscribing system 506. For example, each of smart phone 518, a desktop 520, a server computer 522, a laptop 524 may be an instance of event subscribing device 900. Event subscribing device 900 may include a fourth input interface 502, a fourth output interface 904, a fourth communication interface 906, a fourth computer-readable medium 908, a fourth processor 910, and an event subscribing application 922. Each computing device of event subscribing system 506 may be executing event subscribing application 922 of the same or different type.

Referring again to FIG. 5, ESP device 504 can include any form factor of computing device. For illustration, FIG. 5 represents ESP device 504 as a server computer. In general, a server computer may include faster processors, additional processors, more disk memory, and/or more random access memory (RAM) than a client computer and support multi-threading as understood by a person of skill in the art. ESP device 504 sends and receives signals through network 508 to/from event publishing system 502 and/or to/from event subscribing system 506. ESP device 504 may communicate using various transmission media that may be wired and/or wireless as understood by those skilled in the art. ESP device 504 may be implemented on a plurality of computing devices of the same or different type. Stream processing system 500 further may include a plurality of ESP devices.

Figure 11:
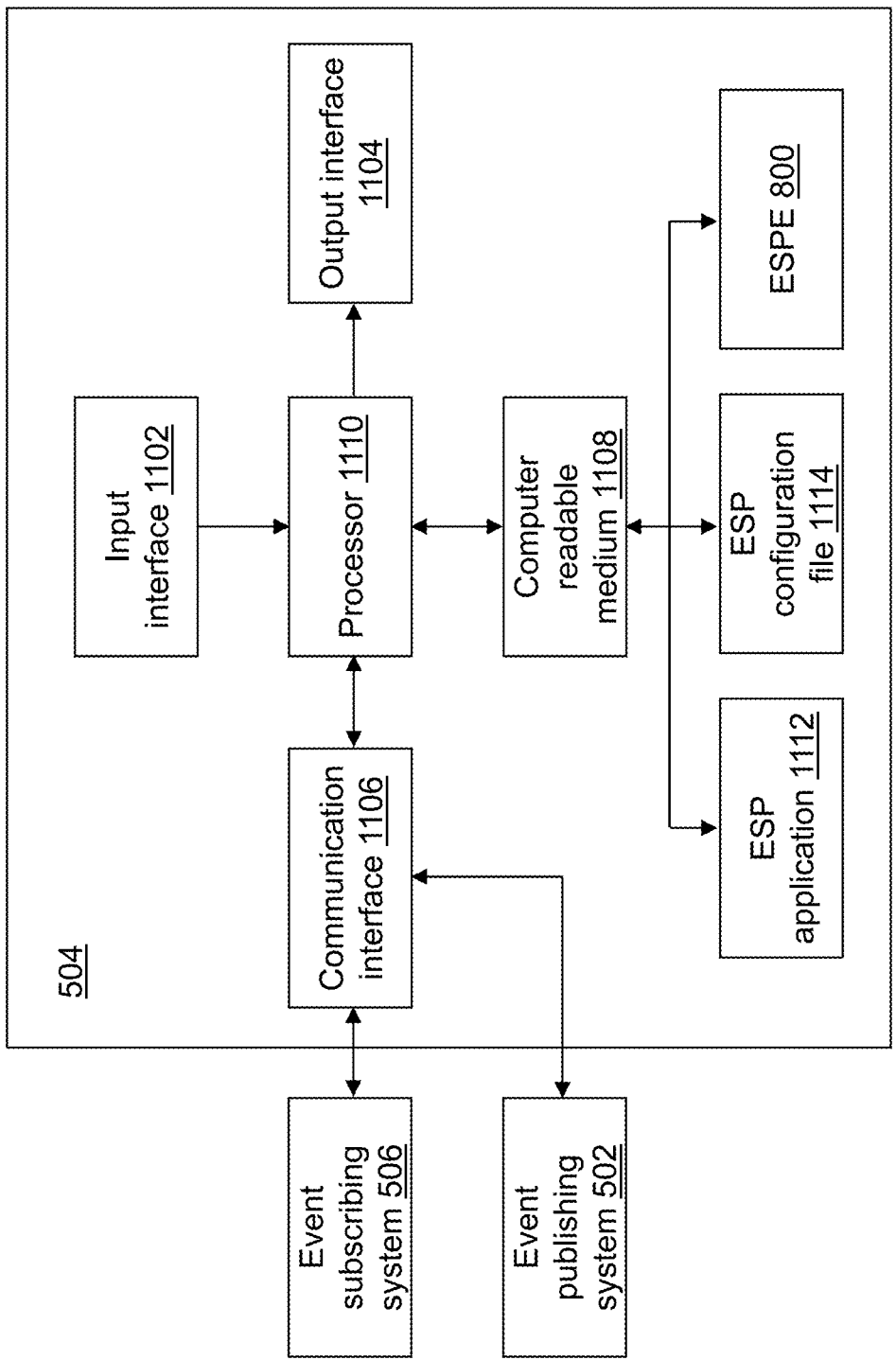
FIG. 11 depicts a block diagram of an ESP device of the stream processing system of FIG. 5 in accordance with an illustrative embodiment.

For illustration, referring to FIG. 11, a block diagram of ESP device 504 is shown in accordance with an example embodiment. ESP device 504 may include a fifth input interface 1102, a fifth output interface 1104, a fifth communication interface 706, a fifth computer-readable medium 708, a fifth processor 1110, an ESP application 1112, an ESP configuration file 1114, and an ESP engine (ESPE) 1116. ESP device 504 executes ESP application 1112 that reads ESP configuration file 1114 to instantiate ESPE 800 to perform the operations of classification model training application 122 and of classification prediction application 322.

Referring to FIG. 6, each event publishing device 600 of event publishing system 502 may include the same or different components and combinations of components. Fewer, different, and additional components may be incorporated into event publishing device 600. Event publishing device 600 may be part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things. For example, event publishing device 600 can include one or more types of the same or different sensors, and high value analytics can be applied to identify hidden relationships and drive increased efficiencies. This can apply to both big data analytics and real-time analytics. Event publishing device 600 may be referred to as an edge device, and may include edge computing circuitry. Event publishing device 600 may provide a variety of stored or generated data, such as network data or data specific to the network devices themselves.

In one example application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data as close to the source as possible, and can initiate action in response to pertinent information in sub-second time frames. This way, the trucking company does not have to move all of their data through network 508 or even store it in the cloud or on-premises in some situations. Also, by monitoring, filtering, and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on-premises or in the cloud, where the trucking company can be enabled to analyze massive amounts of data across a fleet of trucks. Cross-entity analytics can be performed by aggregating data from all of the IoT gateways that are installed on their trucks in their fleet.

ESP can further be use enable the trucking company to take what it learned from the historical data, train new models, update existing models, and bring the new or revised models back to the edge (e.g., the truck). These operations can be performed dynamically (e.g., on the fly) and while the trucks are still on the road.

Third input interface 602 provides the same or similar functionality as that described with reference to input interface 102 of classification model training device 100 though referring to event publishing device 600. Third output interface 604 provides the same or similar functionality as that described with reference to output interface 104 of classification model training device 100 though referring to event publishing device 600. Third communication interface 606 provides the same or similar functionality as that described with reference to communication interface 106 of classification model training device 100 though referring to event publishing device 600. Data and messages may be transferred between event publishing device 600 and ESP device 504 using third communication interface 606. Third computer-readable medium 608 provides the same or similar functionality as that described with reference to computer-readable medium 108 of classification model training device 100 though referring to event publishing device 600. Third processor 610 provides the same or similar functionality as that described with reference to processor 110 of classification model training device 100 though referring to event publishing device 600.

Event publishing application 622 performs operations associated with generating, capturing, and/or receiving a measurement data value and publishing the measurement data value in an event stream to one or more computing devices of event subscribing system 506 through ESP device 504. The operations may be implemented using hardware, firmware, software, or any combination of these methods. Referring to the example embodiment of FIG. 6, event publishing application 622 is implemented in software (comprised of computer-readable and/or computer-executable instructions) stored in third computer-readable medium 608 and accessible by third processor 610 for execution of the instructions that embody the operations of event publishing application 622. Event publishing application 622 may be written using one or more programming languages, assembly languages, scripting languages, etc. Event publishing application 622 may be implemented as a Web application.

Figure 7:
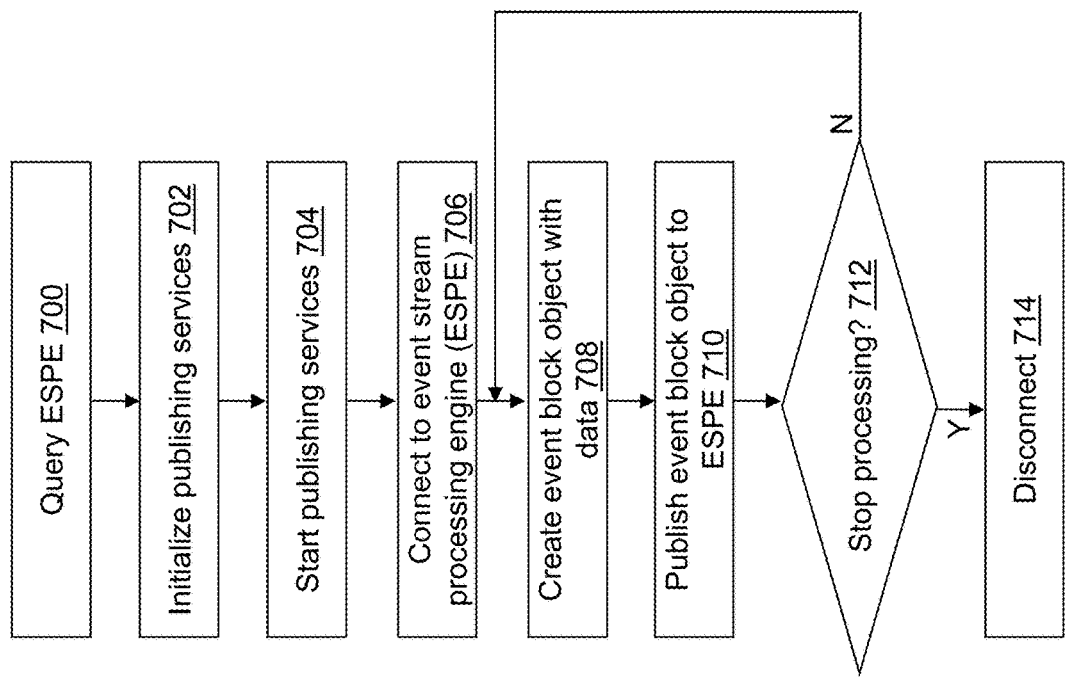
FIG. 7 depicts a flow diagram illustrating examples of operations performed by the event publishing device of FIG. 6 in accordance with an illustrative embodiment.

Referring to FIG. 7, example operations associated with event publishing application 622 are described. Additional, fewer, or different operations may be performed depending on the embodiment. The order of presentation of the operations of FIG. 7 is not intended to be limiting. A user can interact with one or more user interface windows presented to the user in a display under control of event publishing application 622 independently or through a browser application in an order selectable by the user. Although some of the operational flows are presented in sequence, the various operations may be performed in various repetitions, concurrently, and/or in other orders than those that are illustrated. For example, a user may execute event publishing application 622, which causes presentation of a first user interface window, which may include a plurality of menus and selectors such as drop-down menus, buttons, text boxes, hyperlinks, etc. associated with event publishing application 622 as understood by a person of skill in the art. As further understood by a person of skill in the art, various operations may be performed in parallel, for example, using a plurality of threads or a plurality of computing devices such as a grid or a cloud of computing devices.

Figure 8:
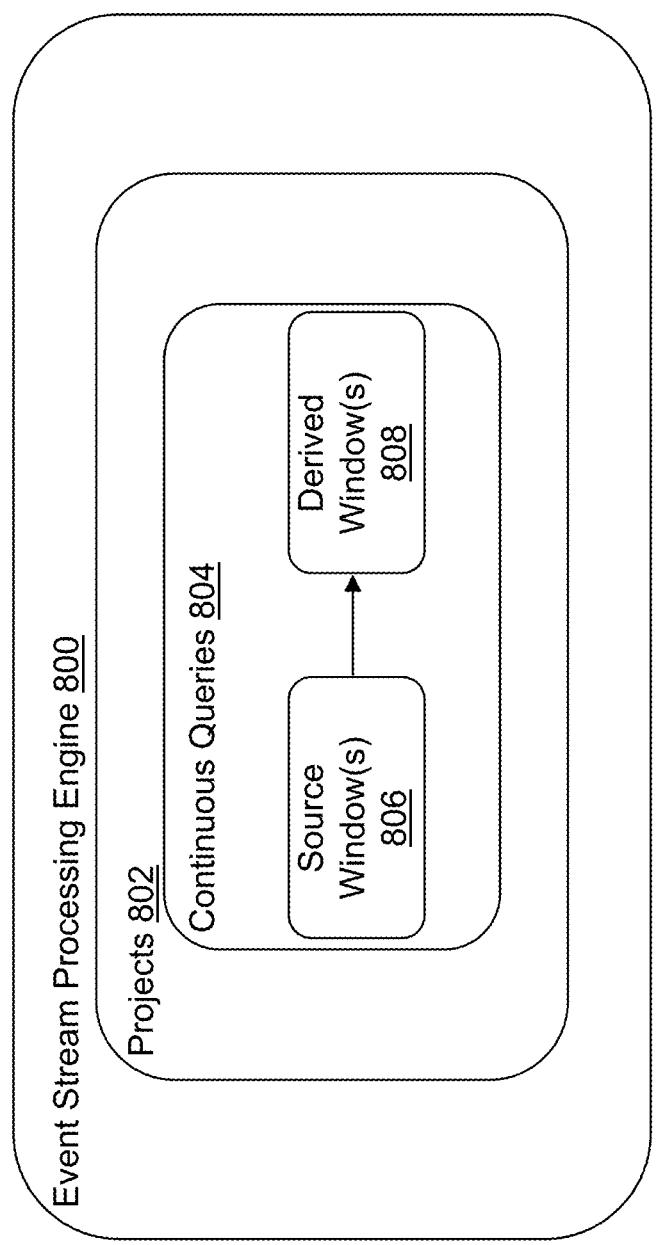
FIG. 8 depicts a block diagram of an event stream processing (ESP) engine executing on an ESP device of the stream processing system of FIG. 5 in accordance with an illustrative embodiment.

In an operation 700, an ESPE 800 is queried, for example, to discover projects 802, continuous queries 804, windows 806, 808, window schema, and window edges currently running in ESPE 800. For example, referring to FIG. 8, the components of ESPE 800 are shown in accordance with an illustrative embodiment. In an illustrative embodiment, event publishing device 600 queries ESPE 800.

ESPE 800 may include one or more projects 802. A project may be described as a second-level container in an engine model managed by ESPE 800 where a thread pool size for the project may be defined by a user. A value of one for the thread pool size indicates that writes are single-threaded. Each project of the one or more projects 802 may include one or more continuous queries 804 that contain data flows, which are data transformations of incoming event streams. The one or more continuous queries 804 may include one or more source windows 806 and one or more derived windows 808.

The engine container is the top-level container in a model that manages the resources of the one or more projects 802. In an illustrative embodiment, for example, there is a single ESPE 800 for each instance of an ESP model executed. Each ESPE 800 has a unique engine name. Additionally, the one or more projects 802 may each have unique project names, and each query may have a unique continuous query name and begin with a uniquely named source window of the one or more source windows 806. Each ESPE 800 may or may not be persistent. Each ESPE 800 is a unique process so the projects/queries/windows need not be uniquely named. They are distinguished by the unique input streams received on ESPE-specific TCP/IP connections.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 800 can support the opcodes for events including insert, update, upsert, and delete. As a result, events entering a source window of the one or more source windows 806 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 600, a data transmit time by event publishing device 600, a data receipt time by ESPE 800, etc.

An event block object may be described as a grouping or package of one or more event objects. An event stream may be described as a flow of event block objects. A continuous query of the one or more continuous queries 804 transforms the incoming event stream made up of streaming event block objects published into ESPE 800 into one or more outgoing event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams are directed to the next set of connected windows as defined by the directed graph. The one or more derived windows 808 are all instantiated windows that are not source windows and that have other windows streaming events into them. The one or more derived windows 808 perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Referring again to FIG. 7, the engine name and host/port to ESPE 800 may be provided as an input to the query and a list of strings may be returned with the names of the projects 802, of the continuous queries 804, of the windows 806, 808, of the window schema, and/or of the window edges of currently running projects of ESPE 800. The host is associated with a host name or Internet Protocol (IP) address of ESP device 504. The port is the port number provided when a publish/subscribe (pub/sub) capability is initialized by ESPE 800. The engine name is the name of ESPE 800 such as the engine name of ESPE 800. The engine name of ESPE 800 and host/port to ESP device 504 may be read from a storage location on third computer-readable medium 608, may be provided on a command line, or otherwise input to or defined by event publishing application 622 as understood by a person of skill in the art.

In an operation 702, publishing services are initialized.

In an operation 704, the initialized publishing services are started, which may create a publishing client for the instantiated event publishing application 622. The publishing client performs the various pub/sub activities for the instantiated event publishing application 622. For example, a string representation of a URL to ESPE 800 is passed to a "Start" function. For example, the URL may include the host:port designation of ESPE 800 executing on ESP device 504, a project of the projects 802, a continuous query of the continuous queries 804, and a window of the source windows 806. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 622 is publishing to more than one source window of ESPE 800, the initialized publishing services may be started to each source window using the associated names (project name, continuous query name, source window name).

Pub/sub is a message-oriented interaction paradigm based on indirect addressing. Each event subscribing device 900 of event subscribing system 506 specifies their interest in receiving information from ESPE 800 by subscribing to specific classes of events, while information sources such as event publishing device 600 publish events to ESPE 800 without directly addressing the data recipients. Stream processing system 500 includes ESPE 800 that receives events from event publishing application 622 executing on event publishing device 600 of event publishing system 502 and that publishes processed events to and publishes further processed events to event subscribing application 922 of event subscribing device 900 of event subscribing system 506.

In an operation 706, a connection is made between event publishing application 622 and ESPE 800 executing on ESP device 504 for each source window of the source windows 806 to which any measurement data value is published. To make the connection, the pointer to the created publishing client may be passed to a "Connect" function. If event publishing application 622 is publishing to more than one source window of ESPE 800, a connection may be made to each started window using the pointer returned for the respective "Start" function call.

In an operation 708, an event block object is created by event publishing application 622 that includes a measurement data value. The measurement data value may have been received, captured, generated, etc., for example, through third communication interface 606 or third input interface 602 or by third processor 610. The measurement data value may be processed before inclusion in the event block object, for example, to change a unit of measure, convert to a different reference system, etc. The event block object may include a plurality of measurement data values measured at different times and/or by different devices.

In an operation 710, the created event block object is published to ESPE 800, for example, using the pointer returned for the respective "Start" function call to the appropriate source window. Event publishing application 622 passes the created event block object to the created publishing client, where the unique ID field in the event block object has been set by event publishing application 622 possibly after being requested from the created publishing client. In an illustrative embodiment, event publishing application 622 may wait to begin publishing until a "Ready" callback has been received from the created publishing client. The event block object is injected into the source window, continuous query, and project associated with the started publishing client.

In an operation 712, a determination is made concerning whether or not processing is stopped. If processing is not stopped, processing continues in operation 708 to continue creating and publishing event block objects. If processing is stopped, processing continues in an operation 714.

In operation 714, the connection made between event publishing application 622 and ESPE 800 through the created publishing client is disconnected, and each started publishing client is stopped.

Referring again to FIG. 9, fewer, different, and additional components may be incorporated into event subscribing device 900. Each event subscribing device 900 of event subscribing system 506 may include the same or different components or combination of components.

Fourth input interface 902 provides the same or similar functionality as that described with reference to input interface 102 of classification model training device 100 though referring to event subscribing device 900. Fourth output interface 904 provides the same or similar functionality as that described with reference to output interface 104 of classification model training device 100 though referring to event subscribing device 900. Fourth communication interface 906 provides the same or similar functionality as that described with reference to communication interface 106 of classification model training device 100 though referring to event subscribing device 900. Data and messages may be transferred between event subscribing device 900 and ESP device 504 using fourth communication interface 906. Fourth computer-readable medium 908 provides the same or similar functionality as that described with reference to computer-readable medium 108 of classification model training device 100 though referring to event subscribing device 900. Fourth processor 910 provides the same or similar functionality as that described with reference to processor 110 of classification model training device 100 though referring to event subscribing device 900.

Figure 10:
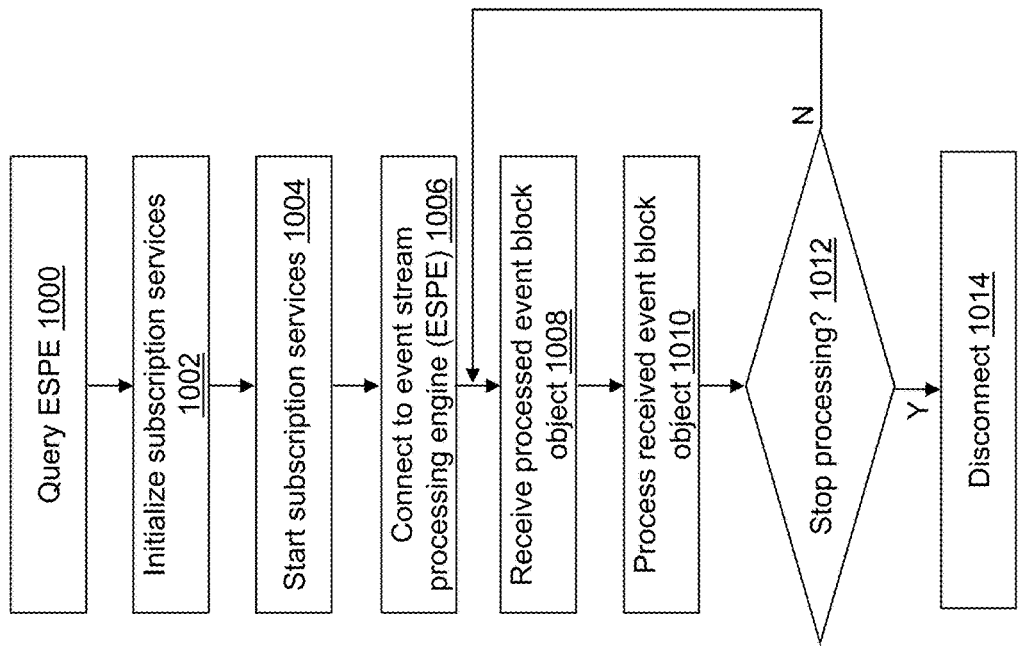
FIG. 10 depicts a flow diagram illustrating examples of operations performed by the event subscribing device of FIG. 9 in accordance with an illustrative embodiment.

Referring to FIG. 10, example operations associated with event subscribing application 912 are described. Additional, fewer, or different operations may be performed depending on the embodiment. The order of presentation of the operations of FIG. 10 is not intended to be limiting.

Similar to operation 700, in an operation 1000, ESPE 800 is queried, for example, to discover names of projects 802, of continuous queries 804, of windows 406,608, of window schema, and of window edges currently running in ESPE 800.

In an operation 1002, subscription services are initialized.

In an operation 1004, the initialized subscription services are started, which may create a subscribing client on behalf of event subscribing application 912 at event subscribing device 900. The subscribing client performs the various pub/sub activities for event subscribing application 912. For example, a URL to ESPE 800 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection may be made between event subscribing application 912 executing on event subscribing device 900 and ESPE 800 through the created subscribing client. To make the connection, the pointer to the created subscribing client may be passed to a "Connect" function and a mostly non-busy wait loop created to wait for receipt of event block objects.

In an operation 1008, an event block object is received by event subscribing application 912 executing on event subscribing device 900.

In an operation 1010, the received event block object is processed based on the operational functionality provided by event subscribing application 912. For example, event subscribing application 912 may extract data from the received event block object and store the extracted data in a database. In addition, or in the alternative, event subscribing application 912 may extract data from the received event block object and send the extracted data to a system control operator display system, an automatic control system, a notification device, an analytic device, etc. In addition, or in the alternative, event subscribing application 912 may extract data from the received event block object and send the extracted data to a post-incident analysis device to further analyze the data. Event subscribing application 912 may perform any number of different types of actions as a result of extracting data from the received event block object. The action may involve presenting information on a fourth display 916 or a fourth printer 920, presenting information using a fourth speaker 918, storing data in fourth computer-readable medium 908, sending information to another device using fourth communication interface 906, etc. A user may further interact with presented information using a fourth mouse 914 and/or a fourth keyboard 912.

In an operation 1012, a determination is made concerning whether or not processing is stopped. If processing is not stopped, processing continues in operation 1008 to continue receiving and processing event block objects. If processing is stopped, processing continues in an operation 1014.

In operation 1014, the connection made between event subscribing application 912 and ESPE 800 through the subscribing client is disconnected, and the subscribing client is stopped.

Referring again to FIG. 11, fewer, different, or additional components may be incorporated into ESP device 504. ESP device 504 receives event block objects that may include measurement data values from event publishing system 502. Fifth computer-readable medium 1108 may provide an electronic storage medium for the received event block objects.

Fifth input interface 1102 provides the same or similar functionality as that described with reference to input interface 102 of classification model training device 100 though referring to ESP device 504. Fifth output interface 1104 provides the same or similar functionality as that described with reference to output interface 104 of classification model training device 100 though referring to ESP device 504. Third communication interface 706 provides the same or similar functionality as that described with reference to communication interface 106 of classification model training device 100 though referring to ESP device 504. Data and messages may be transferred between ESP device 504 and event publishing system 502 and/or event subscribing system 506 using fifth communication interface 1106. Fifth computer-readable medium 1108 provides the same or similar functionality as that described with reference to computer-readable medium 108 of classification model training device 100 though referring to ESP device 504. Fifth processor 1110 provides the same or similar functionality as that described with reference to processor 110 of classification model training device 100 though referring to ESP device 504.

ESP application 1112 performs operations associated with coordinating event stream flow between event publishing system 502 and event subscribing system 506 through the one or more computing devices of ESP cluster system 106. The operations may be implemented using hardware, firmware, software, or any combination of these methods. Referring to the example embodiment of FIG. 11, ESP application 1112 is implemented in software (comprised of computer-readable and/or computer-executable instructions) stored in fifth computer-readable medium 1108 and accessible by fifth processor 1110 for execution of the instructions that embody the operations of ESP application 1112. ESP application 1112 may be written using one or more programming languages, assembly languages, scripting languages, etc. ESP application 1112 may be implemented as a Web application.

ESP application 1112 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 1112 to instantiate and to embed ESPE 800, possibly with dedicated thread pools into its own process space.

For further illustration, ESP application 1112 may be implemented using an XML Layer defined for SAS® ESP. The XML Layer enables definition of ESPE 800 with dynamic project creations and deletions. For example, an XML client can feed definitions read from ESP configuration file 1114 into ESPE 800.

The basic syntax for an XML model for ESPE 800 is
```
<engine>
    <projects>
    +<project>
        <contqueries>
        +<contquery>
            <windows>
            +<window-type> </window-type>
            </windows>
            <edges>
            +<edge> </edge>
            </edges>
        </contquery>
        </contqueries>
    </project>
    </projects>
</engine>
```
<engine> is a global wrapper for ESPE 800 that may include an engine name and a publish/subscribe port number as attributes for ESPE 800 such as in the form "engine name=nameString port=portNumber". For illustration, <engine name='myanalysis' port='31417'> may be specified for an engine where 31417 specifies the pub/sub port for ESPE 800 named "myanalysis".

<projects> may be a container for a list of one or more project elements of the one or more projects 802 defined by ESPE 800. <project> defines a project of the one or more projects 802 by identifying execution and connectivity attributes and a list of the one or more continuous queries 804 of each project to execute of the one or more projects 802. <project> may include a project name attribute, a thread attribute, a pub/sub mode attribute, a pub/sub port number attribute, etc. The thread attribute defines a thread pool size. The pub/sub mode attribute options may include "none", "auto", and "manual". When "auto" or "manual is specified, the pub/sub port number attribute specifies the port number. For illustration, <project name='analysis' threads='16' pubsub='manual' port='31417'> may be specified for a project.

<contqueries> may be a container for a list of one or more continuous query elements of the one or more continuous queries 804. Each <contquery> defines a continuous query of the one or more continuous queries 804 of the project and includes windows and edges. <contquery> may include a continuous query name attribute, a window attribute, etc.

<windows> is a container of one or more window-type elements. Illustrative window-type elements may include "aggregate", "compute", "copy", "counter", "filter", "functional", "join", "notification", "pattern", "procedural", "source", "textCategory", "textContext", "textSentiment", "union", etc. For illustration, the following may specify window type elements:
```
<windows>
    <window-source name='factInput' ... </window-source>
    <window-source name='dimensionInput' ... </window-source>
    <window-join name='joinedInput' ... </window-join>
    <window-union name='unionedInput' ... </window-union>
</windows>
```

Each window-type may include a window type name attribute, a pub/sub mode for the window type as well as other attributes based on the window-type. The following is a list of window types:

A "source" type window specifies a source window of a continuous query. Event streams enter continuous queries by being published or injected into a source window.

A "compute" type window defines a compute window, which enables a one-to-one transformation of input events into output events through the computational manipulation of the input event stream fields.

A "copy" type window makes a copy of a parent window, which can be useful to set new event state retention policies. Retention policies can be set in source and copy windows, and events may be deleted when a windows retention policy is exceeded.

An "aggregate" type window is similar to a compute window in that non-key fields are computed. An aggregate window uses a key field or fields for a group-by condition. Unique key field combinations form their own group within the aggregate window such that events with the same key combination are part of the same group.

A "counter" type window counts events streaming through to monitor a number and a rate at events are being processed.

A "filter" type window specifies a window with a registered Boolean filter function or expression that determines which input events are allowed into the filter window.

A "functional" type window specifies different types of functions to manipulate or transform the data in events. Fields in a functional window can be hierarchical, which can be useful for applications such as web analytics.

A "join" type window takes two input windows and a join type. A join window supports equijoins that are one to many, many to one, or many to many. Both inner and outer joins may be supported.

A "notification" type window sends notifications through email, text, or multimedia message. Any number of delivery channels can be specified to send the notifications. A notification window uses the same underlying language and functions as the functional window.

A "pattern" type window enables the detection of events of interest. A pattern defined in this window type is an expression that logically connects declared events of interest. For example, to define a "pattern" window, events of interest are defined and connected using operators such as "AND", "OR", "FBY", "NOT", "NOTOCCUR", and "IS". The operators can accept optional temporal conditions.

A "procedural" type window enables specification of an arbitrary number of input windows and input-handler functions for each input window (that is, event stream).

A "textCategory" window enables categorization of a text field in incoming events. The text field could generate zero or more categories with scores.

A "textContext" window enables abstraction of classified terms from an unstructured string field. This window type can be used to analyze a string field from an event's input to find classified terms. Events generated from those terms can be analyzed by other window types. For example, a pattern window could follow a "textContext" window to look for tweet patterns of interest.

A "textSentiment" window determines a sentiment of text in a specified incoming text field and a probability of its occurrence. A sentiment value is "positive," "neutral," or "negative." The probability is a value between 0 and 1.

A "union" window specifies a simple join that merges one or more streams with the same schema.

Figure 12:
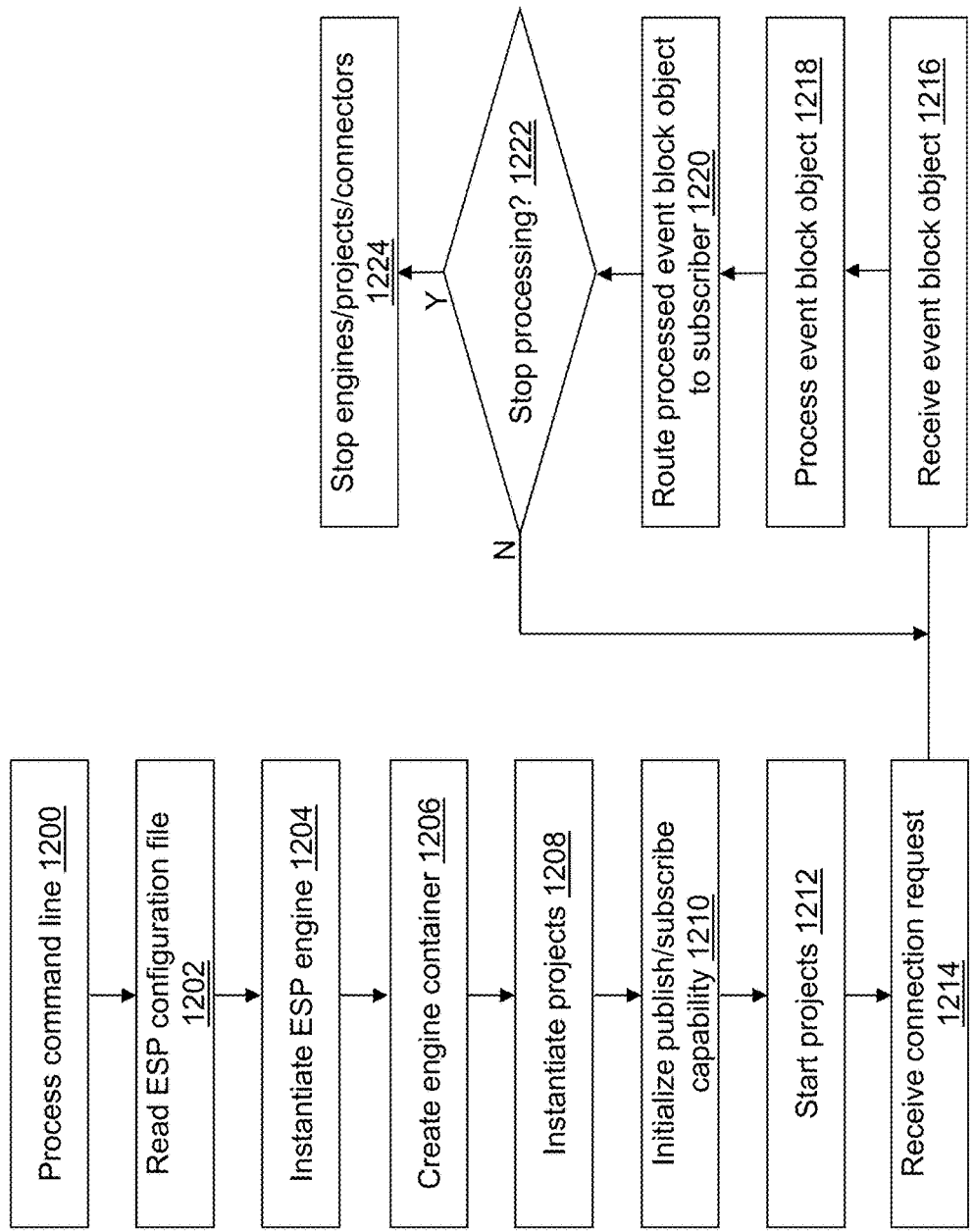
FIG. 12 depicts a flow diagram illustrating examples of operations performed by the ESP device of FIG. 11 in accordance with an illustrative embodiment.

Referring to FIG. 12, example operations associated with ESP application 1112 are described. ESP application 1112 defines how incoming event streams from event publishing system 502 are transformed into meaningful outgoing event streams consumed by event subscribing system 506. Additional, fewer, or different operations may be performed depending on the embodiment. The order of presentation of the operations of FIG. 12 is not intended to be limiting In an operation 1200, a command line is processed to initiate execution of ESP application 1112. A name and a location of ESP configuration file 1114 may be specified as an input parameter. In alternative embodiments, the command line parameters may be defined by default, input by a user through a user interface, etc.

In an operation 1202, ESP configuration file 1114 is read. For illustration, ESP configuration file 1114 may define an XML file that is parsed to define various parameters that are processed to dynamically control the operations performed by ESP application 1112.

The illustrative XML file schema used to define ESP configuration file 1114 may include definitions for an engine instance specification for ESPE 800 that again may be defined based on:

esp_engine_t=element esp-engine {
    attribute name {name_t},
    attribute host {string},
    attribute port {xsd:unsignedShort},
    attribute ha_port {xsd:unsignedShort}
} where the "name" attribute is a name of ESPE 800, the "host" attribute is a host name of the device executing ESPE 800, the "port" attribute is a port number for pub/sub to the device executing ESPE 800, and the "ha_port" attribute is a port number to the administrative server of the device executing ESPE 800. For example, HTTP requests are sent using the "ha_port" attribute; whereas, published events are sent using the "port" attribute.

In an operation 1204, ESPE 800 is instantiated based on the "start=engine" definition read from ESP configuration file 1114.

In an operation 1206, the engine container is created. For illustration, ESPE 800 may be instantiated using a function call that specifies the engine container as a manager for the model. The function call may include the engine name for ESPE 800 that may be unique to ESPE 800.

In an operation 1208, the one or more projects 802 defined by ESP configuration file 1114 are instantiated by ESPE 800 as a model. Instantiating the one or more projects 802 also instantiates the one or more continuous queries 804, the one or more source windows 806, and the one or more derived windows 808 read from ESP configuration file 1114. The one or more continuous queries 804 may be instantiated with a dedicated thread pool or pools that generate updates as new event block objects stream through ESPE 800.

In an operation 1210, the pub/sub capability is initialized for ESPE 800. In an illustrative embodiment, the pub/sub capability is initialized for each project of the one or more projects 802 read from ESP configuration file 1114.

In an operation 1212, the one or more projects 802 read from ESP configuration file 1114 are started. The one or more started projects may run in the background on ESP device 504.

In an operation 1214, a connection request is received from event publishing device 600 for a source window of ESPE 800 to which data will be published or from event subscribing device 900 for a derived window of ESPE 800 from which data will be received.

In an operation 1216, an event block object is received by ESPE 800 from event publishing device 600. An event block object containing one or more event objects is injected into a source window of the one or more source windows 806 read from ESP configuration file 1114.

In an operation 1218, the received event block object is processed through the one or more continuous queries 804 read from ESP configuration file 1114. For example, if event publishing device 600 is publishing event block objects with training data, the event block object may be received in a first source window and routed to a procedural window that performs operations 216 to 230 of FIG. 2 on the training data. Operations 216 and 218 of FIG. 2 may only be performed as part of an initialization phase. If event publishing device 600 is publishing event block objects with operational data similar to input dataset 324, the event block object may be received in a second source window and routed to a procedural window that performs operations 406 to 414 of FIG. 4 on event block objects that include operational data. Operation 406 of FIG. 4 may only be performed when a new classification model is defined as a result of execution of operations 220 to 230 with new training data. For example, operations 216 to 230 of classification model training application 122 and operations 406 to 414 of classification prediction application 322 may be implemented as plugins using the TK streaming analytics plugin framework developed and provided by SAS Institute Inc. of Cary, N.C., USA.

In an operation 1220, the processed event block object is routed to event subscribing device 900. Subscribing devices can correlate a group of subscribed event block objects back to a group of published event block objects by comparing the unique ID of the event block object that a publisher, such as event publishing device 600, attached to the event block object with the event block ID received by a subscribing device, such as event subscribing device 900. The received event block objects further may be stored, for example, in a RAM or cache type memory of fifth computer-readable medium 1108. Event subscribing device 900 may receive the predicted classification from the procedural window that performs operations 406 to 414 of FIG. 4 on event block objects that include operational data.

In an operation 1222, a determination is made concerning whether or not processing is stopped. If processing is not stopped, processing continues in operation 1216 to continue receiving the one or more event streams containing event block objects from event publishing system 502. If processing is stopped, processing continues in an operation 1224.

In operation 1224, the started engines/projects/connectors are stopped and ESPE 800 is shutdown.

ESPE 800 supports an adaptive method for adjusting the penalty value in real time using local search optimization.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
compute a baseline penalty value using a plurality of observation vectors, wherein each observation vector of the plurality of observation vectors includes an explanatory variable value and a response variable value, wherein the baseline penalty value is inversely proportional to a square of a maximum explanatory variable value;
compute a set of penalty values based on the computed baseline penalty value;
for each penalty value of the set of penalty values,
train a classification type model using the respective penalty value and the plurality of observation vectors to compute parameters that define a trained model, wherein the classification type model is trained to predict the response variable value of each observation vector based on the respective explanatory variable value of each observation vector;
validate the trained classification type model using the respective penalty value and the plurality of observation vectors to compute a validation criterion value for the trained classification type model that quantifies a validation error; and
store the computed validation criterion value, the respective penalty value, and the computed parameters that define a trained model to the computer-readable medium;
determine a best classification model based on the stored, computed validation criterion value of each trained classification type model; and
output the respective penalty value and the computed parameters associated with the determined best classification model for predicting a new response variable value from a new observation vector.

2. The non-transitory computer-readable medium of claim 1, wherein the baseline penalty value is computed using $$C_B = \frac{1}{\max_i \|x_i\|^2},$$

where i=1, 2, . . . , $N_T$, $N_T$ is an initialization sample size, and $x_i$ is the explanatory variable value for observation vector i.

3. The non-transitory computer-readable medium of claim 1, wherein the classification type model is selected from the group consisting of a support vector machine model algorithm, and a logistic regression model algorithm.

4. The non-transitory computer-readable medium of claim 1, wherein the validation criterion value is one or more of an accumulative loss function value, an accumulated misclassification error value, and an F-score value.

5. The non-transitory computer-readable medium of claim 1, wherein each observation vector of the plurality of observation vectors includes a plurality of explanatory variable values, wherein the explanatory variable value is one of the plurality of explanatory variable values.

6. The non-transitory computer-readable medium of claim 1, wherein the set of penalty values is computed using $C_B*[\rho^{-t}, \rho^{-t+t}, \ldots, \rho^0, \ldots, \rho^{t-1}, \rho^t]$, where t is a search size parameter, and $\rho$ is a log base parameter.

7. The non-transitory computer-readable medium of claim 1, wherein the computer-readable instructions further cause the computing device to:
read a second explanatory variable value from an input dataset;
compute the new response variable value using the output respective penalty value, the output, computed parameters, and the read second explanatory variable value; and
output the computed new response variable value.

8. The non-transitory computer-readable medium of claim 1, wherein, after outputting the respective penalty value and the computed parameters, the computer-readable instructions further cause the computing device to:
for each penalty value of the set of penalty values,
train the classification type model using the respective penalty value and a second plurality of observation vectors to compute second parameters, wherein each observation vector of the second plurality of observation vectors includes a second explanatory variable value and a second response variable value, wherein the classification type model is trained to predict the second response variable value of each observation vector based on the respective second explanatory variable value of each observation vector;
validate the trained classification type model using the respective penalty value and the second plurality of observation vectors to compute a second validation criterion value; and
store the computed second validation criterion value, the respective penalty value, and the computed second parameters to the computer-readable medium;
determine a new best classification model based on the stored, computed second validation criterion value of each classification type model trained using the second plurality of observation vectors; and
output the respective penalty value and the computed second parameters associated with the determined, new best classification model for predicting a second new response variable value from a second new observation vector.

9. The non-transitory computer-readable medium of claim 8, wherein the computer-readable instructions further cause the computing device to:
read a third explanatory variable value from an input dataset;

compute the new response variable value using the output respective penalty value, the output, computed second parameters, and the read third explanatory variable value; and output the computed new response variable value.

10. The non-transitory computer-readable medium of claim 8, wherein each observation vector of the plurality of observation vectors is received in an event stream.

11. The non-transitory computer-readable medium of claim 10, wherein each observation vector of the second plurality of observation vectors is received in the event stream.

12. The non-transitory computer-readable medium of claim 11, wherein the computer-readable instructions further cause the computing device to:
  receive a third explanatory variable value from an event publishing device;
  compute the new response variable value using the output respective penalty value, the output, computed second parameters, and the received third explanatory variable value; and
  send the computed new response variable value to an event subscribing device.

13. The non-transitory computer-readable medium of claim 1, wherein each observation vector of the plurality of observation vectors is received in an event stream.

14. The non-transitory computer-readable medium of claim 1, wherein the output, computed parameters are Lagrange constants computed by solving for an optimal value of an objective function defined based on the classification type model.

15. A computing device comprising:
  a processor; and
  a non-transitory computer-readable medium operably coupled to the processor, the computer-readable medium having computer-readable instructions stored thereon that, when executed by the processor, cause the computing device to
    compute a baseline penalty value using a plurality of observation vectors, wherein each observation vector of the plurality of observation vectors includes an explanatory variable value and a response variable value, wherein the baseline penalty value is inversely proportional to a square of a maximum explanatory variable value;
    compute a set of penalty values based on the computed baseline penalty value;
    for each penalty value of the set of penalty values,
      train a classification type model using the respective penalty value and the plurality of observation vectors to compute parameters that define a trained model, wherein the classification type model is trained to predict the response variable value of each observation vector based on the respective explanatory variable value of each observation vector;
      validate the trained classification type model using the respective penalty value and the plurality of observation vectors to compute a validation criterion value for the trained classification type model that quantifies a validation error; and
      store the computed validation criterion value, the respective penalty value, and the computed parameters that define a trained model to the computer-readable medium;
    determine a best classification model based on the stored, computed validation criterion value of each trained classification type model; and
    output the respective penalty value and the computed parameters associated with the determined best classification model for predicting a new response variable value from a new observation vector.

16. The computing device of claim 15, wherein the baseline penalty value is computed using $$C_B = \frac{1}{\max_i \|x_i\|^2},$$

where i=1, 2, ..., $N_T$, $N_T$ is an initialization sample size, and $x_i$ is the explanatory variable value for observation vector i.

17. A method of providing training of classification models, the method comprising:
  computing, by a computing device, a baseline penalty value using a plurality of observation vectors, wherein each observation vector of the plurality of observation vectors includes an explanatory variable value and a response variable value, wherein the baseline penalty value is inversely proportional to a square of a maximum explanatory variable value;
  computing, by the computing device, a set of penalty values based on the computed baseline penalty value;
  for each penalty value of the set of penalty values,
    training, by the computing device, a classification type model using the respective penalty value and the plurality of observation vectors to compute parameters that define a trained model, wherein the classification type model is trained to predict the response variable value of each observation vector based on the respective explanatory variable value of each observation vector;
    validating, by the computing device, the trained classification type model using the respective penalty value and the plurality of observation vectors to compute a validation criterion value for the trained classification type model that quantifies a validation error; and
    storing, by the computing device, the computed validation criterion value, the respective penalty value, and the computed parameters that define a trained model to the computer-readable medium;
  determining, by the computing device, a best classification model based on the stored, computed validation criterion value of each trained classification type model; and
  outputting, by the computing device, the respective penalty value and the computed parameters associated with the determined best classification model for predicting a new response variable value from a new observation vector.

18. The method of claim 17, wherein the baseline penalty value is computed using $$C_B = \frac{1}{\max_i \|x_i\|^2},$$

where i=1, 2, ..., $N_T$, $N_T$ is an initialization sample size, and $x_i$ is the explanatory variable value for observation vector i.

19. The method of claim 17, wherein the classification type model is selected from the group consisting of a support vector machine model algorithm, and a logistic regression model algorithm.

20. The method of claim 17, wherein the validation criterion value is one or more of an accumulative loss function value, an accumulated misclassification error value, and an F-score value.

21. The method of claim 17, wherein each observation vector of the plurality of observation vectors includes a plurality of explanatory variable values, wherein the explanatory variable value is one of the plurality of explanatory variable values.

22. The method of claim 17, wherein the set of penalty values is computed using $C_B*[\rho^{-t}, \rho^{-t+1}, \ldots, \rho^0, \ldots, \rho^{t-1}, \rho^t]$, where t is a search size parameter, and $\rho$ is a log base parameter.

23. The method of claim 17, further comprising:
reading, by the computing device, a second explanatory variable value from an input dataset;
computing, by the computing device, the new response variable value using the output respective penalty value, the output, computed parameters, and the read second explanatory variable value; and
outputting, by the computing device, the computed new response variable value.

24. The method of claim 17, further comprising after outputting the respective penalty value and the computed parameters:
for each penalty value of the set of penalty values,
training, by the computing device, the classification type model using the respective penalty value and a second plurality of observation vectors to compute second parameters, wherein each observation vector of the second plurality of observation vectors includes a second explanatory variable value and a second response variable value, wherein the classification type model is trained to predict the second response variable value of each observation vector based on the respective second explanatory variable value of each observation vector;
validating, by the computing device, the trained classification type model using the respective penalty value and the second plurality of observation vectors to compute a second validation criterion value; and
storing, by the computing device, the computed second validation criterion value, the respective penalty value, and the computed second parameters to the computer-readable medium;
determining, by the computing device, a new best classification model based on the stored, computed second validation criterion value of each classification type model trained using the second plurality of observation vectors; and
outputting, by the computing device, the respective penalty value and the computed second parameters associated with the determined, new best classification model for predicting a second new response variable value from a second new observation vector.

25. The method of claim 24, further comprising:
reading, by the computing device, a third explanatory variable value from an input dataset;
computing, by the computing device, the new response variable value using the output respective penalty value, the output, computed second parameters, and the read third explanatory variable value; and
outputting, by the computing device, the computed new response variable value.

26. The method of claim 24, wherein each observation vector of the plurality of observation vectors is received in an event stream.

27. The method of claim 26, wherein each observation vector of the second plurality of observation vectors is received in the event stream.

28. The method of claim 27, further comprising:
receiving, by the computing device, a third explanatory variable value from an event publishing device;
computing, by the computing device, the new response variable value using the output respective penalty value, the output, computed second parameters, and the received third explanatory variable value; and
sending, by the computing device, the computed new response variable value to an event subscribing device.

29. The method of claim 17, wherein each observation vector of the plurality of observation vectors is received in an event stream.

30. The method of claim 17, wherein the output, computed parameters are Lagrange constants computed by solving for an optimal value of an objective function defined based on the classification type model.

* * * * *

UNITED STATES PATENT AND TRADEMARK OFFICE
CERTIFICATE OF CORRECTION

PATENT NO. : 10,049,302 B1
APPLICATION NO. : 15/911882
DATED : August 14, 2018
INVENTOR(S) : Liu et al.

Page 1 of 1

It is certified that error appears in the above-identified patent and that said Letters Patent is hereby corrected as shown below:

In the Specification

Column 10, Line 55:
Delete the phrase "where the $i$-th row of $X$ corresponds to $x_i$, $Y=_1$, diag($y_1, y_2, \ldots, y_n$)," and replace with --where the $i$-th row of $X$ corresponds to $x_i$, $Y = $ diag($y_1, y_2, \ldots, y_n$),--.

Signed and Sealed this
Fourth Day of December, 2018

Andrei Iancu
*Director of the United States Patent and Trademark Office*

UNITED STATES PATENT AND TRADEMARK OFFICE
CERTIFICATE OF CORRECTION

PATENT NO.        : 10,049,302 B1
APPLICATION NO.   : 15/911882
DATED             : August 14, 2018
INVENTOR(S)       : Jun Liu et al.

Page 1 of 1

It is certified that error appears in the above-identified patent and that said Letters Patent is hereby corrected as shown below:

In the Specification

<u>Column 1, Lines 6-9</u>:
Delete the sentence "The present application claims the benefit of 35 U.S.C. § 111(e) to U.S. Provisional Patent Application No. 62/533,585 filed on July 17, 2017, the entire contents of which are hereby incorporated by reference." and replace with --The present application claims the benefit of 35 U.S.C. § 119(e) to U.S. Provisional Patent Application No. 62/533,585 filed on July 17, 2017, the entire contents of which are hereby incorporated by reference.--.

Signed and Sealed this
Twentieth Day of August, 2019

Andrei Iancu
*Director of the United States Patent and Trademark Office*